(12) United States Patent
Fortier et al.

(10) Patent No.: US 10,885,138 B2
(45) Date of Patent: Jan. 5, 2021

(54) METHODS AND COMPUTER-READABLE MEDIA FOR ENABLING SECURE ONLINE TRANSACTIONS WITH SIMPLIFIED USER EXPERIENCE

(71) Applicant: BCE INC., Verdun (CA)

(72) Inventors: Stephane Maxime Francois Fortier, Breakeyville (CA); Jean Bouchard, Sillery (CA); James Francis Fagan, Ottawa (CA); Sean MacLean Murray, Toronto (CA); Sanro Zlobec, Notre-Dame-de-l'Ile-Perrot (CA)

(73) Assignee: BCE INC., Verdun (CA)

( * ) Notice: Subject to any disclaimer, the term of this patent is extended or adjusted under 35 U.S.C. 154(b) by 0 days.

(21) Appl. No.: 16/247,009

(22) Filed: Jan. 14, 2019

(65) Prior Publication Data

US 2019/0146968 A1 May 16, 2019

Related U.S. Application Data

(62) Division of application No. 12/087,427, filed as application No. PCT/CA2007/001802 on Oct. 11, 2007, now Pat. No. 10,180,958.

(Continued)

(51) Int. Cl.
*G06F 16/24* (2019.01)
*G06F 16/9535* (2019.01)
(Continued)

(52) U.S. Cl.
CPC .......... *G06F 16/9535* (2019.01); *G06F 16/24* (2019.01); *G06Q 20/02* (2013.01);
(Continued)

(58) Field of Classification Search
CPC .......... G06Q 30/0251; G06Q 30/0254; G06Q 30/0264; G06Q 30/0255; G06Q 20/10;
(Continued)

(56) References Cited

U.S. PATENT DOCUMENTS 6,363,357 B1 * 3/2002 Rosenberg ............. G06Q 30/06
705/26.43
6,892,184 B1 * 5/2005 Komem .................. G06Q 20/10
705/26.1

(Continued)

*Primary Examiner* — Andrew Joseph Rudy
(74) *Attorney, Agent, or Firm* — Gowling WLG (Canada) LLP

(57) ABSTRACT

A method, which comprises determining a logical identifier used for communication over a network portion managed by a service provider and transmitting to a computing apparatus adapted to effect online transactions involving a payer and a payee an indication of the service provider having agreed to act as the payer for at least one online transaction requested by a requesting device that uses the logical identifier. Also, a method, which comprises determining a logical identifier used to identify a device during a request for an online transaction; identifying, based on the logical identifier, a third party that has agreed to act as a payer for the online transaction; providing a user of the device with an opportunity to confirm the third party as the payer for the online transaction; and completing the online transaction based on input from the user.

31 Claims, 16 Drawing Sheets

Related U.S. Application Data

(60) Provisional application No. 60/941,830, filed on Jun. 4, 2007.

(51) Int. Cl.
| | |
|---|---|
| *H04W 4/02* | (2018.01) |
| *H04L 29/08* | (2006.01) |
| *G06Q 30/02* | (2012.01) |
| *G06Q 40/00* | (2012.01) |
| *G06Q 20/02* | (2012.01) |
| *G06Q 20/10* | (2012.01) |
| *G06Q 20/40* | (2012.01) |
| *H04L 29/06* | (2006.01) |

(52) U.S. Cl.
CPC ............ *G06Q 20/10* (2013.01); *G06Q 20/40* (2013.01); *G06Q 30/0251* (2013.01); *G06Q 30/0253* (2013.01); *G06Q 30/0254* (2013.01); *G06Q 30/0255* (2013.01); *G06Q 30/0264* (2013.01); *G06Q 30/0269* (2013.01); *G06Q 30/0277* (2013.01); *G06Q 40/00* (2013.01); *G06Q 40/12* (2013.12); *H04L 63/0892* (2013.01); *H04L 67/02* (2013.01); *H04L 67/10* (2013.01); *H04L 67/306* (2013.01); *H04W 4/023* (2013.01)

(58) Field of Classification Search
CPC ............... G06Q 20/40; G06Q 30/0277; G06Q 30/0253; G06Q 30/0269; G06Q 20/02; G06Q 40/00; G06Q 40/12; G06F 16/9535; G06F 16/24; H04L 67/10; H04L 63/0892; H04L 67/306; H04L 67/02; H04W 4/023

USPC ........ 705/26.1, 28, 30, 35, 39; 709/223–225
See application file for complete search history.

(56) References Cited

U.S. PATENT DOCUMENTS

| | | | |
|---|---|---|---|
| 7,647,278 B1* | 1/2010 | Foth ...................... | G06Q 20/10 |
| | | | 380/270 |
| 7,689,468 B2* | 3/2010 | Walker ................... | G06Q 20/04 |
| | | | 705/26.4 |
| 7,885,844 B1* | 2/2011 | Cohen .................... | G06Q 10/10 |
| 8,371,919 B2* | 2/2013 | Hornik ................ | G07F 17/3265 |
| | | | 463/16 |
| 8,498,892 B1* | 7/2013 | Cohen .................... | G06Q 10/06 |
| | | | 705/7.38 |
| 9,372,939 B2* | 6/2016 | Lim ....................... | G06Q 30/00 |
| 9,430,773 B2* | 8/2016 | Aloni ..................... | G06Q 20/10 |
| 9,659,326 B2* | 5/2017 | Evans ................... | G06Q 20/102 |
| 10,180,958 B2* | 1/2019 | Fortier .............. | G06Q 30/0251 |
| 10,269,040 B2* | 4/2019 | Lim .................. | G06Q 30/0256 |
| 10,586,279 B1* | 3/2020 | Ramos .............. | G06Q 30/0251 |

* cited by examiner

| Logical identifier | Information regarding premium customer 1 | Information regarding a set of whitelisted/blacklisted network sites |
|---|---|---|
| Logical identifier | Information regarding premium customer i | Information regarding a set of whitelisted/blacklisted network sites |
| Logical identifier | Information regarding premium customer M | Information regarding a set of whitelisted/blacklisted network sites |

METHODS AND COMPUTER-READABLE MEDIA FOR ENABLING SECURE ONLINE TRANSACTIONS WITH SIMPLIFIED USER EXPERIENCE

CROSS-REFERENCE TO RELATED APPLICATION

This application is a Divisional of U.S. application Ser. No. 12/087,427, which is a National Phase entry of International Application No. PCT/CA2007/001802 filed Oct. 11, 2007, and claims the benefit under 35 USC 119(e) of U.S. Provisional Patent Application No. 60/941,830 filed on Jun. 4, 2007, and hereby incorporated by reference herein.

FIELD OF THE INVENTION

The present invention relates generally to online commerce and, more particularly, to methods and computer-readable media for enabling secure online transactions in which the user experience related to effecting such transactions is simplified.

BACKGROUND

Online transactions are becoming increasingly common. Naturally, a user must first be online (i.e., have access to the Internet) before he or she can make an online transaction. Accordingly, in a typical residential Internet access scenario, a user employs customer premises equipment (such as a computer equipped with a modem) to log in to a service provider account, whereupon the customer premises equipment is authorized by the service provider to access the Internet. At this point, the user is "online" and is free to use the customer premises equipment in order to browse among the multitude of servers (i.e., merchant websites) from which online transactions can be effected. Typically, the user identifies a particular merchant website, browses the goods or services offered, and identifies those items of interest (e.g., by adding them to an electronic "shopping cart").

One of the most important yet sensitive aspects of electronic commerce is the "checkout" phase, whereby payment data (e.g., credit card information) needs to be provided to the merchant website in order to purchase the items of interest (namely, those in the electronic shopping cart). Here, many things can go wrong from a security and/or a user experience standpoint. For example, incorrect or fraudulent payment data may be provided via the merchant website, or the user may discover that he or she has insufficient funds or credit to pay for the items of interest. Compounding these difficulties is the sheer amount of time that the user needs to expend attempting to purchase one or more items of interest. Moreover, due to the fear of identity theft, certain users are reluctant to provide merchants with their credit card numbers online under any circumstances.

Against this background, there is a need in the industry for solutions that will enable secure online transactions to take place, in which the user experience related to effecting such transactions is simplified.

SUMMARY OF THE INVENTION

A first broad aspect of the present invention seeks to provide a method, which comprises determining a logical identifier used for communication over a network portion managed by a service provider and transmitting to a computing apparatus adapted to effect online transactions involving a payer and a payee an indication of the service provider having agreed to act as the payer for at least one online transaction requested by a requesting device that uses the logical identifier.

A second broad aspect of the present invention seeks to provide a network entity, which comprises an interface configured to communicate over a network portion managed by a service provider; and a processing unit configured to determine a logical identifier used for communication over the network portion and to transmit to a computing apparatus adapted to effect online transactions involving a payer and a payee an indication of the service provider having agreed to act as the payer for at least one online transaction requested by a requesting device that uses the logical identifier.

A third broad aspect of the present invention seeks to provide a computer-readable medium comprising computer-readable program code which, when interpreted by a network entity, causes the network entity to execute a method. The computer-readable program code comprises first computer-readable program code for causing the network entity to determine a logical identifier used for communication over a network portion managed by a service provider; and second computer-readable program code for causing the network entity to transmit to a computing apparatus adapted to effect online transactions involving a payer and a payee an indication of the service provider having agreed to act as the payer for at least one online transaction requested by a requesting device that uses the logical identifier.

A fourth broad aspect of the present invention seeks to provide a network entity, which comprises means for determining a logical identifier used for communication over a network portion managed by a service provider; and means for transmitting to a computing apparatus adapted to effect online transactions involving a payer and a payee an indication of the service provider having agreed to act as the payer for at least one online transaction requested by a requesting device that uses the logical identifier.

A fifth broad aspect of the present invention seeks to provide a method, which comprises determining a logical identifier used to identify a device during a request for an online transaction; identifying, based on the logical identifier, a third party that has agreed to act as a payer for the online transaction; providing a user of the device with an opportunity to confirm the third party as the payer for the online transaction; and completing the online transaction based on input from the user.

A sixth broad aspect of the present invention seeks to provide a network entity, which comprises an interface configured to communicate with devices requesting online transactions; and a processing unit. The processing unit is configured to determine a logical identifier used to identify a device during a request for an online transaction; identify, based on the logical identifier, a third party that has agreed to act as a payer for the online transaction; provide a user of the device with an opportunity to confirm the third party as the payer for the online transaction; and complete the online transaction based on input from the user.

A seventh broad aspect of the present invention seeks to provide a computer-readable medium comprising computer-readable program code which, when interpreted by a network entity, causes the network entity to execute a method. The computer-readable program code comprises first computer-readable program code for causing the network entity to determine a logical identifier used to identify a device during a request for an online transaction; second computer-readable program code for causing the network entity to identify, based on the logical identifier, a third party that has agreed to act as a payer for the online transaction; third computer-readable program code for causing the network entity to provide a user of the device with an opportunity to confirm the third party as the payer for the online transaction; and fourth computer-readable program code for causing the network entity to complete the online transaction based on input from the user.

An eighth broad aspect of the present invention seeks to provide a network entity, which comprises means for determining a logical identifier used to identify a device during a request for an online transaction; means for identifying, based on the logical identifier, a third party that has agreed to act as a payer for the online transaction; means for providing a user of the device with an opportunity to confirm the third party as the payer for the online transaction; and means for completing the online transaction based on input from the user.

A ninth broad aspect of the present invention seeks to provide a memory storing data for access by an application program being executed by a clearinghouse entity, the memory comprising a data structure representing an association between (I) logical identifiers for use by devices in requesting online transactions and (II) respective service providers having agreed to act as payers for online transactions requested by devices that use those logical identifiers.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 3D shows a consolidated database made up of the databases in FIGS. 2 and 3C.

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1:
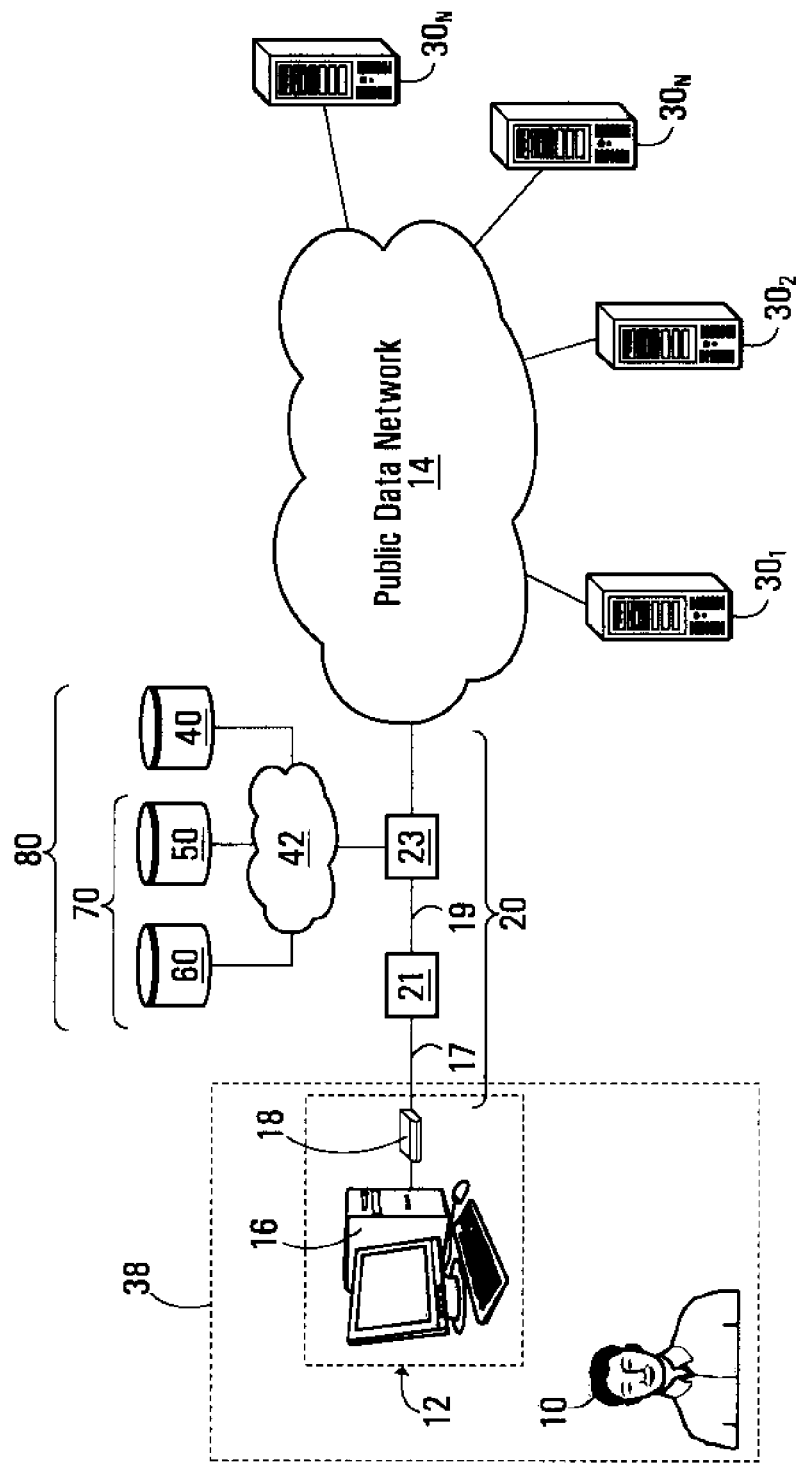
FIG. 1 is a block diagram of an architecture allowing a customer of a service provider to enjoy various telecommunications services in accordance with an embodiment of the present invention.

FIG. 1 depicts an architecture allowing customers of a service provider to enjoy various telecommunications services, notably Internet access, in accordance with an embodiment of the present invention. The service provider provides customer premises equipment with access to a public data network 14 such as the Internet. Specifically, the service provider operates a network access server 23 that allows a connection to be established between customer premises equipment 12 located at a service point 38 and the public data network 14. In this way, a user 10 of customer premises equipment 12 can interact with network sites (such as merchant websites) connected to the public data network 14.

In this embodiment, customer premises equipment 12 comprises a computing device 16 and a network interface unit 18, although it should be appreciated that customer premises equipment 12 may comprise other components in other embodiments. Computing device 16 may be implemented as a personal computer (PC) such as a desktop computer, a laptop computer, or a tablet PC. The computing device 16 is provided with at least one input device such as a keyboard, a mouse, a touchscreen, a stylus, a microphone, etc., as well as a display and possibly one or more other output devices (e.g., speakers) that enable interaction between user 10 and computing device 16. Computing device 16 is operative to run a software application implementing a network application (e.g., a web browser) with which user 10 can interact via the display (and possibly one or more other output devices) and the at least one input device in order to access and interact with network sites of the public data network 14.

Network interface unit 18 enables customer premises equipment 12 to exchange data over the public data network 14 via a network portion 20. For example, in various embodiments, and depending on the nature of network portion 20, network interface unit 18 may be implemented as a modem such as a broadband modem (e.g., a digital subscriber line (DSL) modem or a cable modem) or a narrowband modem (e.g., a dial-up modem). Although it is shown as being a separate component in FIG. 1, network interface unit 18 may be integrated into computing device 16 (e.g., it may comprise a card slotted in computing device 16). In other embodiments, the network interface unit 18 may be implemented as part of a home gateway or router forming part of the customer premises equipment 12.

Network portion 20 may traverse one or more network elements and comprise one or more physical links and one or more logical links. For example, network portion 20 may comprise a physical link 17 between network interface unit 18 and a network element 21. Physical link 17 may comprise one or more of a copper twisted pair, a coax cable, an Ethernet link, a fiber optic link (e.g., fiber to the premises (FTTP)) and a fixed wireless link, to name a few non-limiting possibilities. Depending on the nature of physical link 17, network element 21 may be a DSL access multiplexer (DSLAM), a cable modem termination system (CMTS), a modem pool, or another type of network element. Network portion 20 may also comprise a dedicated logical link 19 between network element 21 and another network element 23 that provides access to the public data network 14. For instance, network element 23 may be a network access server (NAS), a router, or another type of entity operated or managed by the service provider. For ease of understanding, but without limiting the scope of the invention, network element 23 will hereinafter be referred to as an "access server".

In order to exchange data over the public data network 14, customer premises equipment 12 communicating over network portion 20 is identified by a logical identifier. In various non-limiting embodiments, the logical identifier may be an Internet Protocol (IP) address (e.g., in compliance with IPv4 or IPv6) or a proprietary address, label, or tag. The logical identifier may be static, in which case it does not change over time (e.g., a static IP address). Alternatively, the logical identifier may be dynamic, in which case it may change over time (e.g., a dynamic IP address).

The logical identifier may be selected by a network element that is part of, or connected to, network portion 20, such as access server 23. Specifically, access server 23 may select the logical identifier when customer premises equipment 12 is activated (e.g., when network interface unit 18 and/or computing device 16 is/are powered-up) or otherwise regains network connectivity and/or at certain time intervals which may range from an hour or less to several months or more. For instance, in embodiments where the logical identifier is a dynamic IP address, access server 23 can select the logical identifier in accordance with the Dynamic Host Configuration Protocol (DHCP) using a pool of IP addresses.

Figure 2:
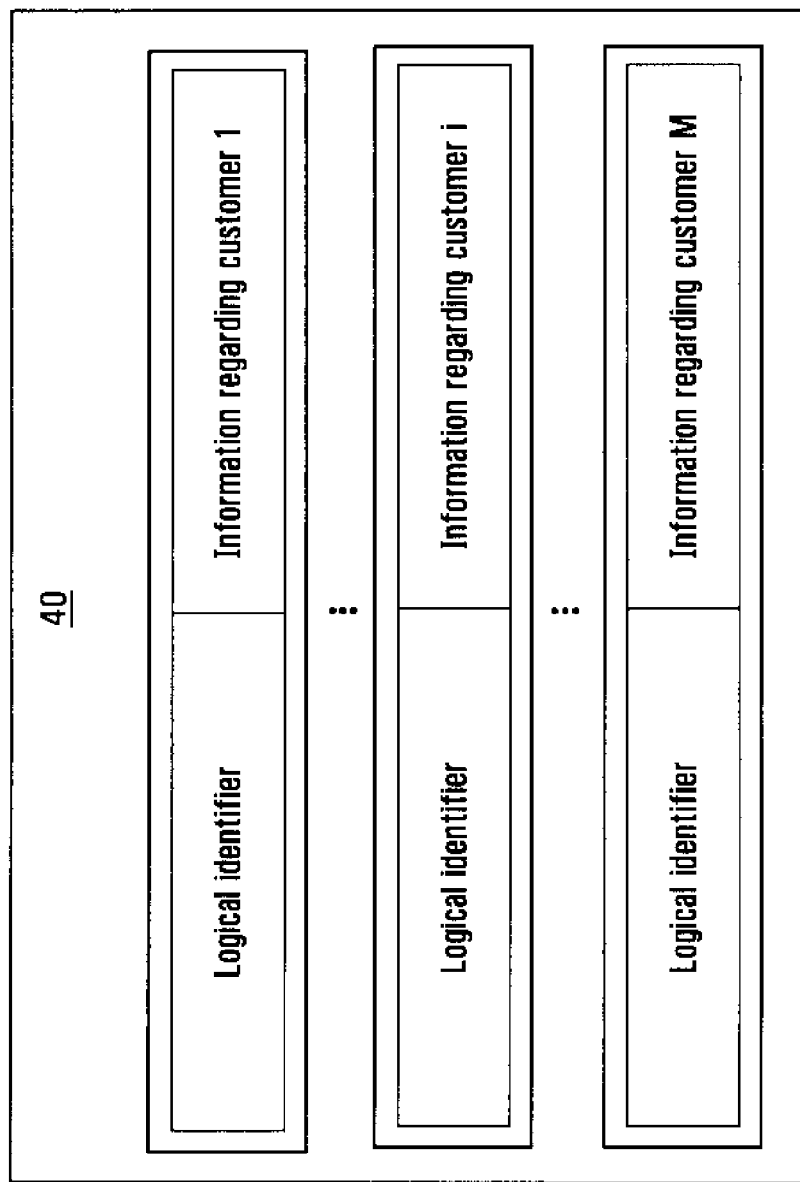
FIG. 2 shows potential contents of a database maintained by the service provider and which associates logical identifiers to customers.

Access server 23 has access to a database 40, which associates logical identifiers to customers as shown in greater detail in FIG. 2. Access to database 40 may be provided via a service provider network 42. One manner of populating database 40 will be explained in further detail later on. For now, suffice it to say that when computing device 16 requests access to the public data network 14 over network portion 20 leading to customer premises equipment 12, a logical identifier is selected for use by computing device 16. Similarly, when other devices request access to the public data network 14 over other network portions, individual logical identifiers are selected for use by those devices as well. Because the service provider knows which customers are located at which service point locations via which network portions, the service provider can associate individual logical identifiers to individual customers and it is this information that is stored in database 40.

For example, the service provider may know that a certain customer "Bob Smith" is located at service point 38 (e.g., by virtue of a service and/or billing relationship stored in a customer service database), and also knows that network portion 20 leads to service point 38. Therefore, by selecting the logical identifier, say, "1.2.3.4" for use by a device that requests access to the public data network 14 over network portion 20 (such as computing device 16), the service provider has in fact associated customer "Bob Smith" with logical identifier "1.2.3.4", and accordingly stores this relationship in database 40.

It should be noted that although user 10 requires customer "Bob Smith's" credentials to access the public data network 14, it is not necessarily the case that the user 10 is in fact Bob Smith, the person. For example, user 10 could, at a given point in time, be Bob Smith or his wife or any of his children, for example. Nevertheless, one need not take this distinction into account in the present specification unless specifically noted otherwise.

As mentioned previously, user 10 can use customer premises equipment 12 to access and interact with network sites of the public data network 14. These network sites can be implemented by servers $30_1 \ldots 30_N$ connected to the public data network 14. The servers $30_1 \ldots 30_N$ and the network sites that they implement are operated, managed or otherwise associated with various entities, including, for example, companies, governmental organizations, non-profit organizations, and individuals. Each of the servers $30_1 \ldots 30_N$ comprises suitable hardware, firmware, software, control logic, or a combination thereof for implementing a plurality of functional components, including an interface and a processing unit. The interface of each of the servers $30_1 \ldots 30_N$ is adapted to receive messages from and send messages to communication equipment (such as customer premises equipment 12) connected to the public data network 14, as well as to receive data from or send data to other elements (e.g., computers or databases) communicatively coupled to that server but not necessarily connected to the data network 14. The processing unit of each of the servers $30_1 \ldots 30_N$ is adapted to effect various processing operations to implement that server's functionality.

Assume now that server $30n$ ($1 \leq n \leq N$) implements a merchant website, which is operated, managed or otherwise associated with a merchant. Interaction between user 10 and the merchant website implemented by server $30n$ typically involves the network browser implemented by computing device 16 interacting with server $30n$ in order to allow user 10 to view, hear or otherwise be exposed to content (e.g., web pages) of the merchant website implemented by server $30n$ via the display and/or one or more other output devices of computing device 16, and possibly to supply information (e.g., by entering text, selecting an option, etc.) and/or one or more commands (e.g., by clicking on a graphical button or a hyperlink) via the at least one input device of computing device 16.

Occasionally, during interaction with the merchant website implemented by server $30n$, user 10 may desire or need to request an online transaction requiring payment. Such online transactions involve a payer and a payee, where the payer is a party that is to provide funds to the payee and the payee is a party that is to receive the funds from the payer. Depending on the nature of the merchant website implemented by server $30n$, an online transaction requiring payment may involve purchasing of product(s) and/or service(s) offered on the merchant website; settlement of a bill for a previously obtained product or service; making a donation to a charity or other institution through the merchant website; etc. It will be appreciated that various other situations may arise in which online transactions requiring payment may be desired or may need to be effected.

Figure 3A:
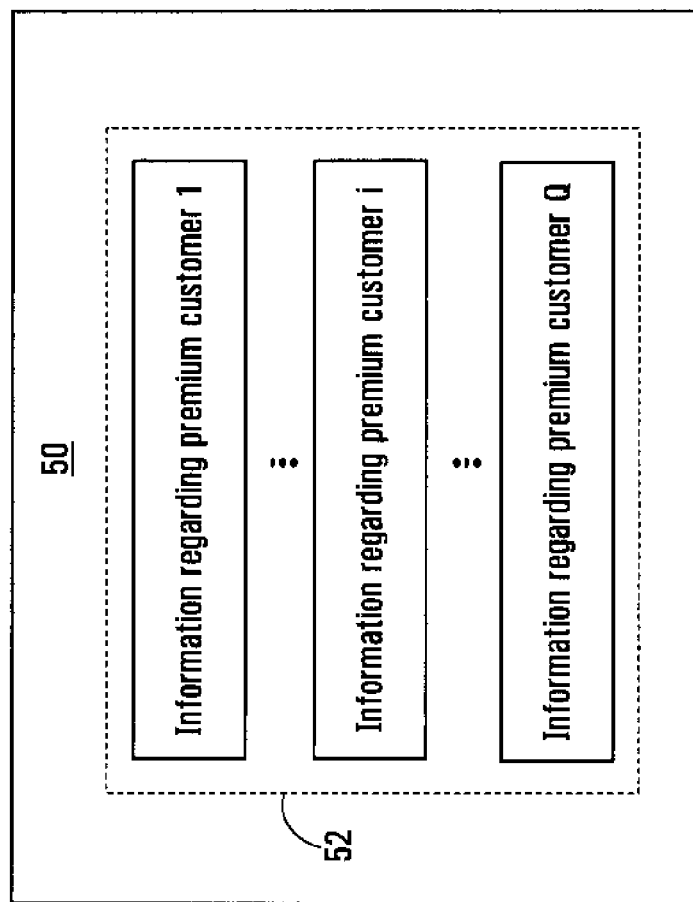
FIG. 3A shows potential contents of a premium customer list maintained by the service provider.

In accordance with a non-limiting embodiment of the present invention, the service provider will have agreed to act as the payer for online transactions requested by certain customers, hereinafter referred to as "premium customers". With additional reference to FIG. 3A, these premium customers are identified in a "premium customer list" 52 stored in a database 50 which can be accessible to access server 23 via the service provider network 42. The premium customer list 52 can be populated in a variety of ways. It is envisaged, for example, that a customer desirous of appearing on the premium customer list 52 can contact the service provider (e.g., via phone, fax, e-mail, in person, etc.) and make a request to be added to the premium customer list 52. Naturally, the service provider may exercise its discretion in allowing a prospective premium customer to appear on the premium customer list 52. In particular, the service provider may study the credit history of the prospective premium customer and/or other related information and, if certain criteria are satisfied, may allow the prospective premium customer to indeed be added to the premium customer list 52. The service provider may charge a monthly or per-transaction fee to the customer in question. In another scenario, the service provider may offer certain qualified customers who are not yet premium customers the opportunity to be added to the premium customer list 52. Such an offer may be communicated to these targeted customers in the form of an insert with their monthly bill or via an email message or a telephone inquiry, for example.

Database 50 may also include, for each premium customer on the premium customer list 52, information related to certain restrictions, such as a pecuniary restriction, applicable to that premium customer. Specifically, an example of a pecuniary restriction that may be applicable to a particular premium customer may represent a maximum dollar amount of an online transaction for which the service provider will agree to act as the payer. Still other information may be included such as temporal restriction (e.g., times of the day or days of the week during which the service provider will agree to act as the payer for an online transaction requested by the particular premium customer), and so on.

Figure 3B:
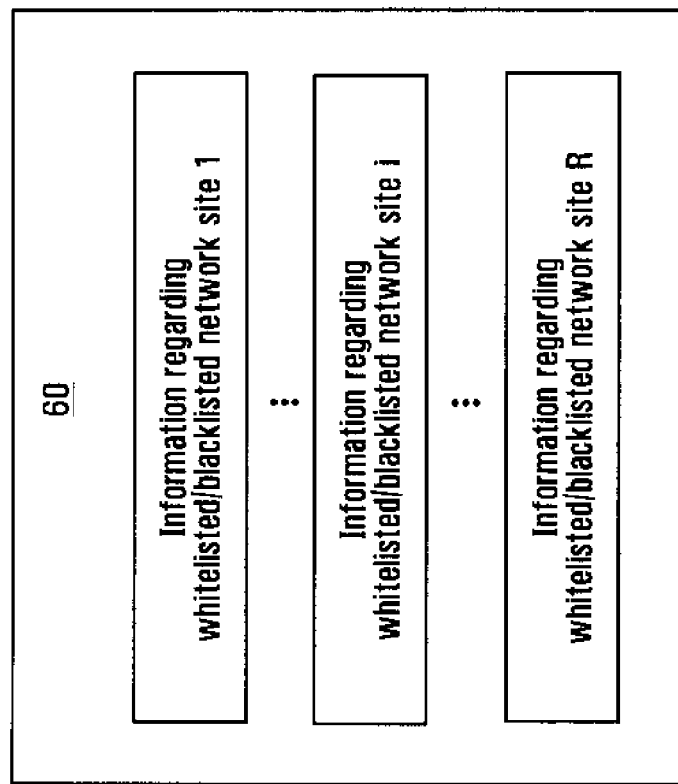
FIG. 3B shows potential contents of a database indicative of trust relationships established between the service provider and various network sites.

With additional reference now to FIG. 3B, there is shown a further database 60, which is optional, and is indicative of trust relationships that have been established between the service provider and various ones of the network sites. Database 60 may be accessible to the access server 23 via the service provider network 42. Specifically, database 60 includes a list of whitelisted or blacklisted network sites (e.g., merchant websites). A whitelisted network site and a blacklisted network site can be defined by the service provider's agreement or unwillingness, respectively, to act as a payer for online transactions requested by premium customers visiting those sites. Specifically, while the service provider will be in agreement to act as the payer for online transactions requested by premium customers visiting a whitelisted network site, the opposite is true for a blacklisted network site. The whitelisted or blacklisted sites can be identified by their logical identifiers (e.g., IP addresses) or by their uniform resource locators (URLs).

As part of the trust relationship formed between the service provider and a particular one of the network sites, a mechanism is established to allow the service provider to act as the payer for online transactions involving premium customers visiting the particular one of the network sites. For example, an account for the service provider can be set up by the merchant website implemented by server $30n$, with the result being that the service provider's account will be debited in order to consummate an online transaction for which the service provider has been identified as the payer. In an alternative scenario, the service provider may provide a credit card or other source of funds each time an online transaction for which the service provider has been identified as the payer is about to be consummated.

Figure 3C:
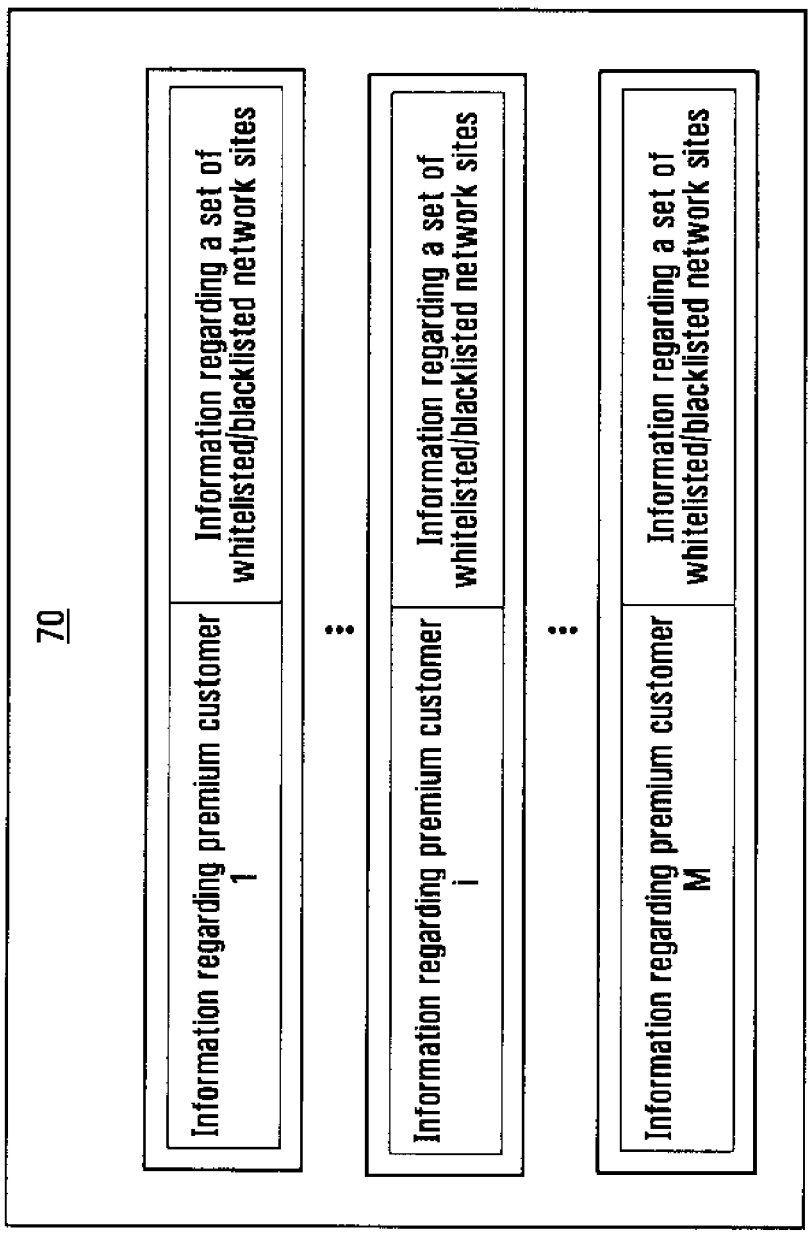
FIG. 3C shows a consolidated database made up of the databases in FIGS. 3A and 3B.

Furthermore, with additional reference to FIG. 3C, it is also contemplated that the information in databases 50 and 60 can be combined into a single database 70 and further customized for each premium customer. Specifically, database 70 includes a premium customer list which may also specify a pecuniary and/or temporal restriction for each premium customer on the premium customer list. In addition, each premium customer on the premium customer list is associated with a set of whitelisted or blacklisted network sites. Thus, it is envisaged that the set of whitelisted or blacklisted network sites may be different from one premium customer to another.

Furthermore, with additional reference to FIG. 3D, it is also contemplated that the information in databases 70 and 40 can be combined into a single database 80 so as to provide, in association with each premium customer, the same information as in database 70 in addition to the logical identifier that has been selected for use by devices accessing the public data network 14 from the service point location associated with that premium customer.

In operation, access server 23 (including one or more network entities that may be associated therewith) functions in a way that will now be described generally and then in some detail in the context of a specific example. Generally speaking, access server 23 monitors data exchanged by various devices using various logical identifiers to determine the logical identifiers of those devices susceptible of requesting an online transaction with one or more of the servers $30_1 \ldots 30_N$. Furthermore, access server 23 determines whether these logical identifiers are associated with premium customers. In the case where a premium customer has been identified in this manner for a particular logical identifier, access server 23 sends a voucher to the server involved in communication with the device that is using the particular logical identifier. The voucher indicates that the service provider has agreed to act as the payer for an online transaction that is susceptible of being requested by a device using the particular logical identifier.

Figure 4A:
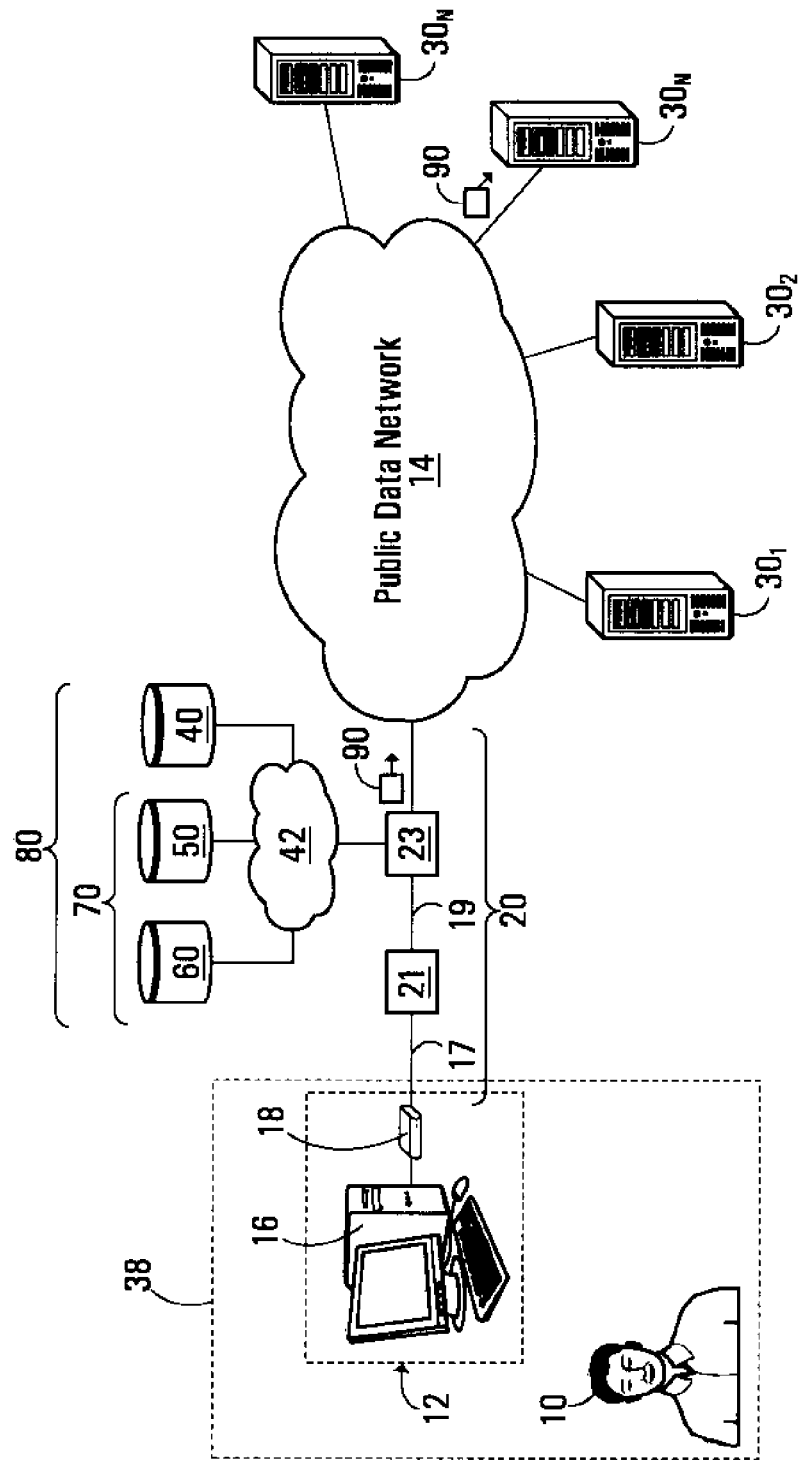
FIG. 4A shows a flow of messages illustrative of a scenario where a user of a computing device interacts with a network site in order to request an online transaction, and where the service provider determines that the online transaction is susceptible of taking place and consequently issues a voucher that is sent to the network site.

With reference now to FIG. 4A, consider now the example scenario where user 10 interacts with the merchant website implemented by server $30n$ using computing device 16 in order to select one or more products and/or services for purchase. This may involve user 10 using an online shopping cart implemented by server $30n$. In this non-limiting example, computing device 16 employs logical identifier "1.2.3.4". Because communication between computing device 16 and server $30n$ occurs via access server 23, the latter can make a determination that an online transaction is susceptible of being requested by a device that is using logical identifier "1.2.3.4" (which, in this case, is computing device 16). In one example, this determination can be made based on analysis of the data exchanged between computing device 16 and server $30n$. In an alternative embodiment, access server 23 can make a determination that an online transaction is susceptible of being requested by the nature of the website being visited by computing device 16. For example, certain websites (such as ebay.com) are more likely to result in requests for online transactions than others (such as cnn.com).

Meanwhile, access server 23 also determines the identity of the customer associated with logical identifier "1.2.3.4". This can be achieved by consulting database 40. In this particular example, let the customer in question be "Bob Smith". Access server 23 then consults database 50 to see whether "Bob Smith" is a premium customer, i.e., whether "Bob Smith" appears on the premium customer list 52. If "Bob Smith" is not a premium customer, then no further steps need be taken and, indeed, access server 23 may cease analysis of the data exchanged between computing device 16 and server 30n.

However, if "Bob Smith" is a premium customer, which is assumed to be the case here, then access server 23 sends a voucher 90 to server 30n. In accordance with two non-limiting possibilities, the voucher 90 can be encrypted if it is to be sent over an untrusted channel (such as the public data network 14) or it can be sent over a secure channel separate from the public data network. The voucher 90 sent to server 30n may be in the form of an electronic message comprising logical identifier "1.2.3.4". The voucher 90 may be encoded in a format that alerts server 30n as to its significance, namely that the service provider has agreed to act as the payer for an eventual online transaction requested by a device that uses logical identifier "1.2.3.4" (which, in this case, is computing device 16). Of course, the voucher 90 sent to server 30n may comprise additional information that can be obtained from database 50, such as a pecuniary and/or temporal restriction associated with the eventual online transaction. The voucher 90 sent to server 30n may further contain information regarding the service provider responsible for managing the entity from which the voucher 90 is being sent. Such information may be provided in a message header, for example. It should be appreciated that for security purposes, the voucher 90 may also specify a time-out period after which the information contained therein is no longer valid.

It should also be appreciated that an additional verification can be performed by access server 23 prior to transmittal of the voucher 90 in order to confirm that a trust relationship has indeed been established between the service provider and server 30n. In one embodiment, this verification can be performed by consulting database 60. In another embodiment, this verification can be performed by consulting database 70 for the information pertaining to customer "Bob Smith". In fact, consultation of database 60 to confirm the existence of a trust relationship with server 30n (or consultation of database 70 to confirm that server 30n is included among the whitelisted—or not blacklisted—network sites for customer "Bob Smith") can be performed as an initial step so as to avoid unnecessary analysis of the data exchanged by computing device 16, in the event that no trust relationship was actually established with the server 30n (or in the event that server 30n is a blacklisted—or not whitelisted—network site for customer "Bob Smith").

Figure 4B:
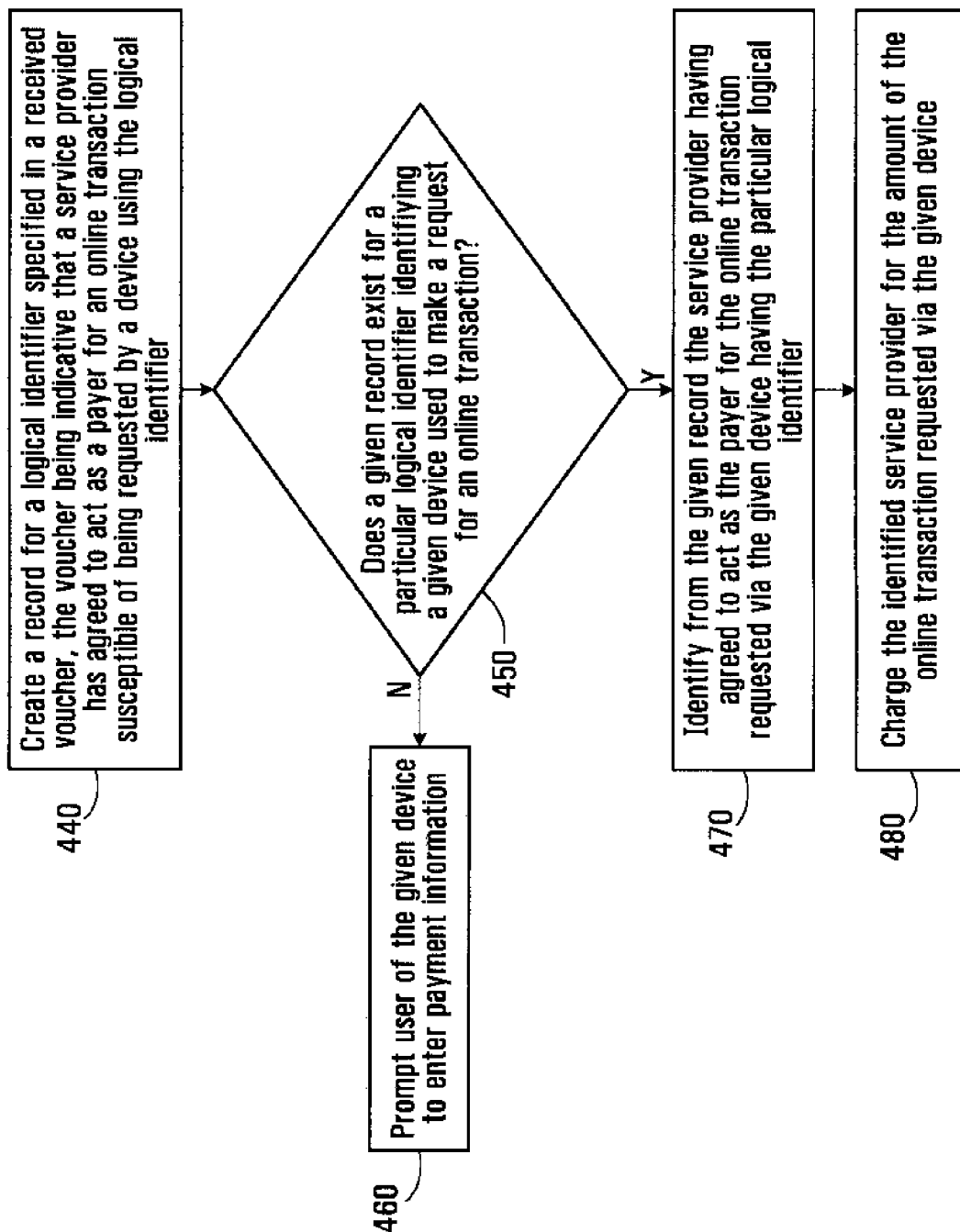
FIG. 4B is a flowchart showing steps in processing of the voucher by the network site.

Upon receipt from access server 23 of the voucher 90 indicative of the service provider having agreed to act as the payer for an online transaction that is susceptible of being requested by a device using the particular logical identifier (in this case, logical identifier "1.2.3.4"), server 30n functions in a way that will now be described. Generally speaking, and with reference now to FIG. 4B, at step 440, server 30n creates a record for the particular logical identifier, and stores therein information regarding the service provider responsible for managing the service provider entity that sent the voucher 90, which information may be contained in a message header of the voucher 90. It should be appreciated that a validation stage may take place to ensure that the service provider information being received in connection with the voucher 90 concurs with the identity of a service provider with which the merchant website implemented by server 30n has established a trust relationship. If the voucher 90 also specifies a pecuniary and/or temporal restriction, or a time-out period, such information is also stored in the record for the particular logical identifier. Similar records can be created for other logical identifiers used by devices involved in potential transactions with the merchant website implemented by server 30n. The records may be kept in a memory of server 30n.

Meanwhile, interaction of computing device 16 with the merchant website carries on, as do possibly other interactions involving other devices. Although the interaction involving computing device 16 may be aborted at any time, it is assumed for the purposes of the present example that it reaches the "check-out" phase. This is a phase where user 10 indicates that he/she desires to purchase the selected product(s) and/or service(s), for instance, by selecting a "check-out" option on the merchant website implemented by server 30n. This constitutes a request for an online transaction by the computing device 16. Customarily, the merchant website implemented by server 30n would subsequently prompt user 10 to provide payment information towards the selected product(s) and/or service(s). However, in accordance with a non-limiting embodiment of the present invention, and with continued reference to FIG. 4B, at step 450, server 30n is configured to verify whether there exists a record for the logical identifier of the computing device 16, which is in this case "1.2.3.4". If not, then at step 460, user 10 is prompted to enter payment information such as credit card information. User 10 then indicates his/her intent to submit an order to purchase the selected product(s) and/or service(s) using the entered credit card information, for instance, by selecting a "submit order" option on the merchant website.

However, if there exists a record for logical identifier "1.2.3.4", then at step 470, the merchant website implemented by server 30n identifies from this record the service provider that has agreed to act as the payer for online transactions requested by a device having this logical identifier. At step 480, the identified service provider is then charged for the amount of the transaction, while applying of course the pecuniary and/or temporal restrictions in effect, and assuming that the time-out period, if applicable, has not expired. With the identified service provider having been charged for the amount of the transaction, the online transaction is deemed to have been consummated as far as user 10 is concerned. It is envisaged that server 30n may then delete the information in the record associated with logical identifier "1.2.3.4", although in other embodiments it may be desirable to keep this information in memory for a certain period of time to allow further transactions to take place.

There are various ways in which the service provider identified at step 470 can be "charged" for the amount of the transaction. In one example, an account for the service provider can be set up by the merchant website implemented by server 30n, with the result being that the service provider's account will be debited whenever an online transaction for which the service provider has been identified as the payer is consummated. In another example, a handshaking process may be established between server 30n and a predetermined entity managed by the service provider (e.g., a transaction manager) during the course of which a credit card or other source of funds is identified by the service provider to server 30n. Once it has the credit card (or other) information for the service provider, the merchant website implemented by server 30n proceeds in a conventional manner to obtain payment. In yet another example, the merchant website implemented by server 30n may have standing instructions to use a certain credit card or other source of funds whenever an online transaction for which the service provider has been identified as the payer is consummated. In still another example, the voucher 90 sent by access server 23 to server 30n (and whose contents are stored in the record for logical identifier "1.2.3.4") may identify a credit card or other source of funds to be used as payment on behalf of the service provider. In a still further example, the merchant website implemented by server 30n may send an invoice to the service provider.

It should be appreciated that rather than automatically charge the service provider identified at step 470 for the amount of the transaction, the merchant website implemented by server 30n may present user 10 with an opportunity to actively participate in identification of the payer for the current transaction. More specifically, server 30n may be configured to interact with computing device 16 to cause the appearance of a window, dialog box or other graphical user interface that provides user 10 with a choice of whether or not to exert the option of having the service provider pay for the selected product(s) and/or service(s).

Figure 4C:
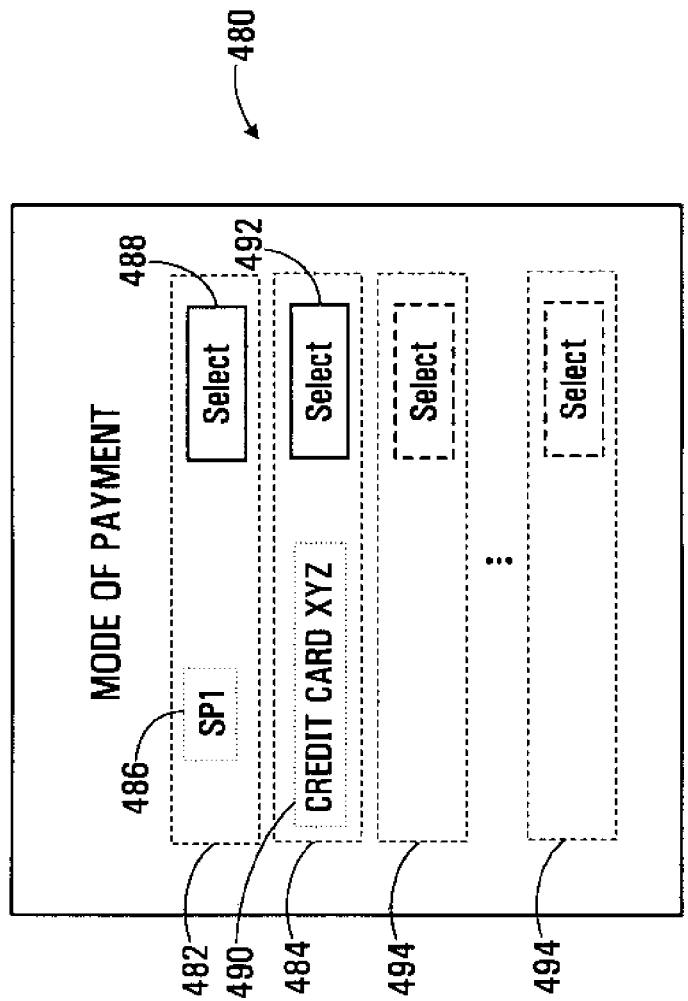
FIG. 4C depicts a "mode of payment" window presented on the computing device used to request the online transaction.

For instance, as shown in FIG. 4C, the merchant website implemented by server 30n can cause the web browser implemented by the computing device 16 to present a "mode of payment" window 480 having a first input area 482 and a second input area 484. The first input area 482 includes a region 486 that illustrates a name or logo of the service provider identified at step 470 (in this case, "SP1"), along with an input mechanism 488 for selecting this service provider as the mode of payment. The second input area 484 includes a region 490 that illustrates a name or logo of a particular credit card, along with an input mechanism 492 for allowing user 10 to select the particular credit card as the mode of payment. Other input areas 494 similar to the second input area 484 can also be provided for other credit cards or payment facilities. If user 10 selects input mechanism 488 (e.g., using a mouse), then the transaction proceeds as described above in the event where the service provider identified at step 470 was automatically charged for the amount of the transaction. However, if user 10 selects input mechanism 492, then the transaction proceeds in a customary manner, requiring user 10 to input credit card information, and so on.

Once the online transaction has been consummated as described above, under the assumption that the service provider identified at step 470 has paid for the product(s) and/or service(s) selected by user 10, the amount of the transaction is then charged to the customer, in this case "Bob Smith". This can be done at various points in time. Specifically, in a first example embodiment, as soon as the merchant website implemented by server 30n issues a receipt for the online transaction to the service provider (including a confirmation of the total dollar amount of the online transaction), the service provider can immediately charge "Bob Smith" by adding the total dollar amount to "Bob Smith's" account. In a second example embodiment, where the service provider used a third-party credit card or other source of funds to pay for the purchased product(s) and/or good(s), the service provider may wait to receive an invoice from the credit card company or a receipt from the merchant website, following which the service provider charges "Bob Smith" by adding the total dollar amount to "Bob Smith's" account. The service provider may also wish to reconcile the invoice from the credit card company with the receipt from the merchant website.

In another example, rather than debiting an account set up specifically for "Bob Smith", the service provider may charge the total dollar amount of the online transaction to a payment instrument (such as a credit card) that has been provisioned by "Bob Smith". Thus, "Bob Smith" is effectively paying by credit card, but the credit card number is not revealed to the merchant website.

The service provider may also charge a service fee on a per-transaction basis. This service fee may be charged to the merchant website or to the customer ("Bob Smith") or both, depending on business considerations.

It should thus be appreciated that the above described solutions allow enhanced security and convenience for premium customers, since there is no need for such customers to disclose credit card information when making purchases from certain merchant websites that are trusted by the service provider but not necessarily by customers. There are also advantages for the service provider, which can increase its revenues through service fees charged to its premium customers and/or merchant websites, while the risk of fraud—particularly identity theft—is kept low. This is due to the fact that knowledge of the logical identifier used by a particular device can be traced to a physical location (namely, the service point location where the device is situated), which is in turn traceable to a specific customer. There are also advantages for the merchants, since they can now tap into a wider base of customers through their trusted relationships with service providers, while the risk to merchants arising from fraud by the service provider is considerably lower than the risk from fraud by the average internet populace.

It should be appreciated that additional mechanisms can be implemented by server 30n and/or the service provider in order to maintain integrity of online transactions. These include, among others, a mechanism for the issuance of transaction IDs by the merchant website implemented by server 30n and a mechanism for the tracking of parcels sent to a physical address.

One will appreciate that although the aforesaid methods are secure enough to ensure that the logical identifier used by a particular device can be traced to a specific customer, the question still remains as to whether user 10 should be permitted to request online transactions. One situation where this question may be raised is in a residential environment where computing device 16 may be used by a number of family members, some of which are adults and others children. Here, even though the customer may be "Bob Smith" (who appears on the premium customer list 52 in database 50), the authority of user 10 to request online transactions may not be established. In order to resolve this situation, the service provider may request "live" authorization of user 10 by way of an authorization process. In an example of an authorization process, user 10 is asked to furnish a code which can be compared to a known authorization code in order to allow or prevent user 10 from continuing with the online transaction.

Specifically, the need to effect an authorization process in association with a particular customer may be stored as an additional column in database 50 or 70, in this case for customer "Bob Smith". The authorization code can also be stored in database 50 or 70, or elsewhere.

In order not to disrupt ordinary Internet access to user 10 (e.g., browsing that does not involve online transactions), it may be desirable to effect the authorization process only at the point where an online transaction is susceptible of being requested, or at the very point of being requested. Accordingly, the aforesaid "mode of payment" window 480 presents an appropriate opportunity to effect the authorization process for user 10 in order to deal with the situation where multiple potential users (e.g., adults and children) are susceptible of using the same customer account, but where it is desired that some of those potential users (e.g., children) not be allowed to make online purchases.

Specifically, access server 23 can monitor the appearance of the "mode of payment" window 480 and commence the authorization process by pre-emoting the "mode of payment" window 480 with a new screen/window/dialog box that prompts user 10 to enter a code for eventual comparison to the authorization code. Alternatively, access server 23 can commence the authorization process by triggering a call back to user 10 at a telephone number pre-registered to customer "Bob Smith". Alternatively, when sending the voucher 90, access server 23 can pre-inform the merchant website implemented by server 30n of the authorization code for customer "Bob Smith", and the "mode of payment" window may comprise a region where user 10 is prompted to enter a code for comparison to the received authorization code. Other possibilities within the scope of the present invention will now be apparent to those of ordinary skill in the art.

Figure 5:
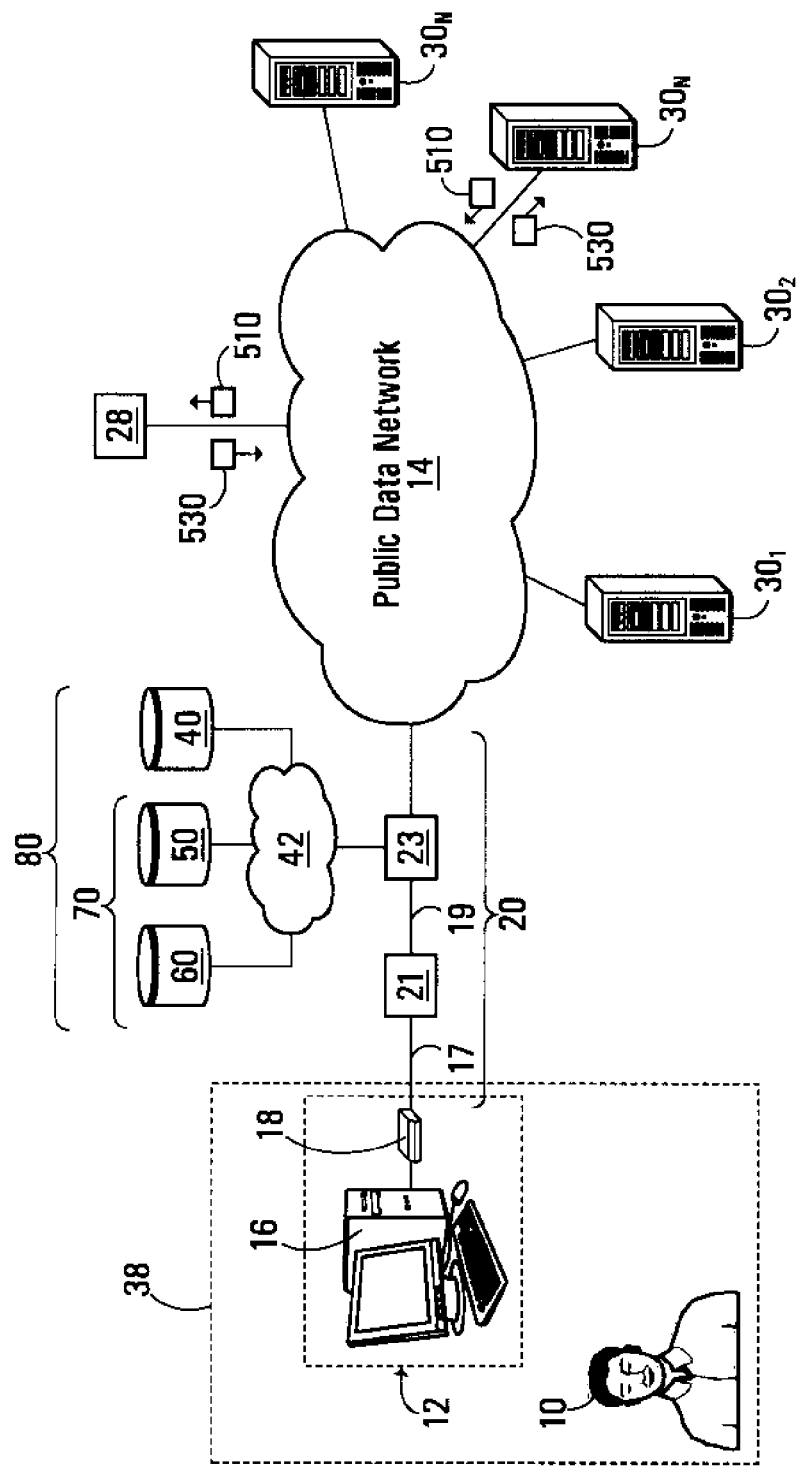
FIG. 5 shows a flow of messages illustrative of a scenario where the user of the computing device interacts with a network site in order to request an online transaction, and where the network site determines that an online transaction is susceptible of taking place and consequently contacts a gateway associated with the service provider.

In an alternative embodiment of the present invention, now described with reference to FIG. 5, consider again the example scenario where user 10 interacts with the merchant website implemented by server 30n using computing device 16 in order to select one or more products and/or services for purchase. This may involve user 10 using an online shopping cart implemented by server 30n. In this non-limiting example, computing device 16 employs logical identifier "5.6.7.8". In this alternative embodiment, it is server 30n (rather than access server 23) that makes a determination that an online transaction is susceptible of being requested by a device that is using logical identifier "5.6.7.8" (which, in this case, is computing device 16). In addition, server 30n determines the identity of the service provider responsible for managing the service provider entity (in this case, access server 23) from which the merchant website implemented by server 30n is being accessed. In one example, these determinations can be made based on analysis of the data received by server 30n.

Server 30n then sends a request message 510 to a gateway 28 associated with the service provider responsible for managing access server 23. This gateway 28 may be reachable at a known location over the public data network 14. The request message 510 includes logical identifier "5.6.7.8".

Meanwhile, server 30n creates a record for logical identifier "5.6.7.8", where information regarding the service provider responsible for managing access server 23 is stored, and where information responsive to the request message 510 will be stored when it is received from the gateway 28.

The gateway 28 receives the request message 510 and determines whether the logical identifier identified therein is associated with a premium customer. To this end, and in context of databases 40 and 50, the gateway 28 first determines the identity of the customer associated with logical identifier "5.6.7.8 by consulting database 40. In this particular example, the customer in question continues to be "Bob Smith". The gateway 28 then consults database 50 to see whether "Bob Smith" is a premium customer, i.e., whether "Bob Smith" appears on the premium customer list 52. If "Bob Smith" is not a premium customer, then the gateway 28 may send a deny message 520 to server 30n, indicating that the service provider is not willing to act as a payer for online transactions requested by a device that uses logical identifier "5.6.7.8".

However, if "Bob Smith" is a premium customer, which is assumed to be the case here, then the gateway 28 returns an accept message 530 to server 30n. The accept message 530 is similar to the previously described voucher 90, except that it need not comprise logical identifier "5.6.7.8", since it is already assumed to be known to server 30n. The accept message 530 does however signify that the service provider has agreed to act as the payer for an eventual online transaction requested by a device that uses logical identifier "5.6.7.8" (which, in this case, is computing device 16). The accept message 530 sent to server 30n may comprise additional information that can be obtained from database 50, such as a pecuniary and/or temporal restriction associated with the eventual online transaction.

It should also be appreciated that an additional verification can be performed by the gateway 28 prior to transmittal of the accept message 530 in order to confirm that a trust relationship has indeed been established between the service provider and server 30n. In one embodiment, this verification can be performed by consulting database 60, which will yield a negative result in certain unusual circumstances, namely where the request message 510 will have been from an untrusted merchant website. In another embodiment, the verification by the gateway 28 can be performed by consulting database 70 for the information pertaining to customer "Bob Smith" in order to confirm whether server 30n is included among the whitelisted (or not blacklisted) network sites for customer "Bob Smith", assuming that customer "Bob Smith" is included among the premium customers for whom information is stored in database 70.

Upon receipt from the gateway 28 of the accept message 530 indicative of the service provider having agreed to act as the payer for an online transaction that is susceptible of being requested by a device using logical identifier "5.6.7.8", server 30n functions in a way that will now be described. Generally speaking, server 30n stores in the aforesaid record for logical identifier "5.6.7.8" an indication that the service provider has agreed to act as the payer for an online transaction that is susceptible of being requested by a device using logical identifier "5.6.7.8". If the response message 530 also specifies a pecuniary and/or temporal restriction, or a time-out period, such information is also stored in the record for logical identifier "5.6.7.8".

Meanwhile, interaction of computing device 16 with the merchant website carries on, as do possibly other interactions involving other devices. It is assumed for the purposes of the present example that the interaction involving computing device 16 reaches the "check-out" phase, where user 10 indicates that he/she desires to purchase the selected product(s) and/or service(s), e.g., by selecting a "check-out" option on the merchant website implemented by server 30n. This constitutes a request for an online transaction by the computing device 16. The remainder of this example scenario is identical to that given above.

Figure 6:
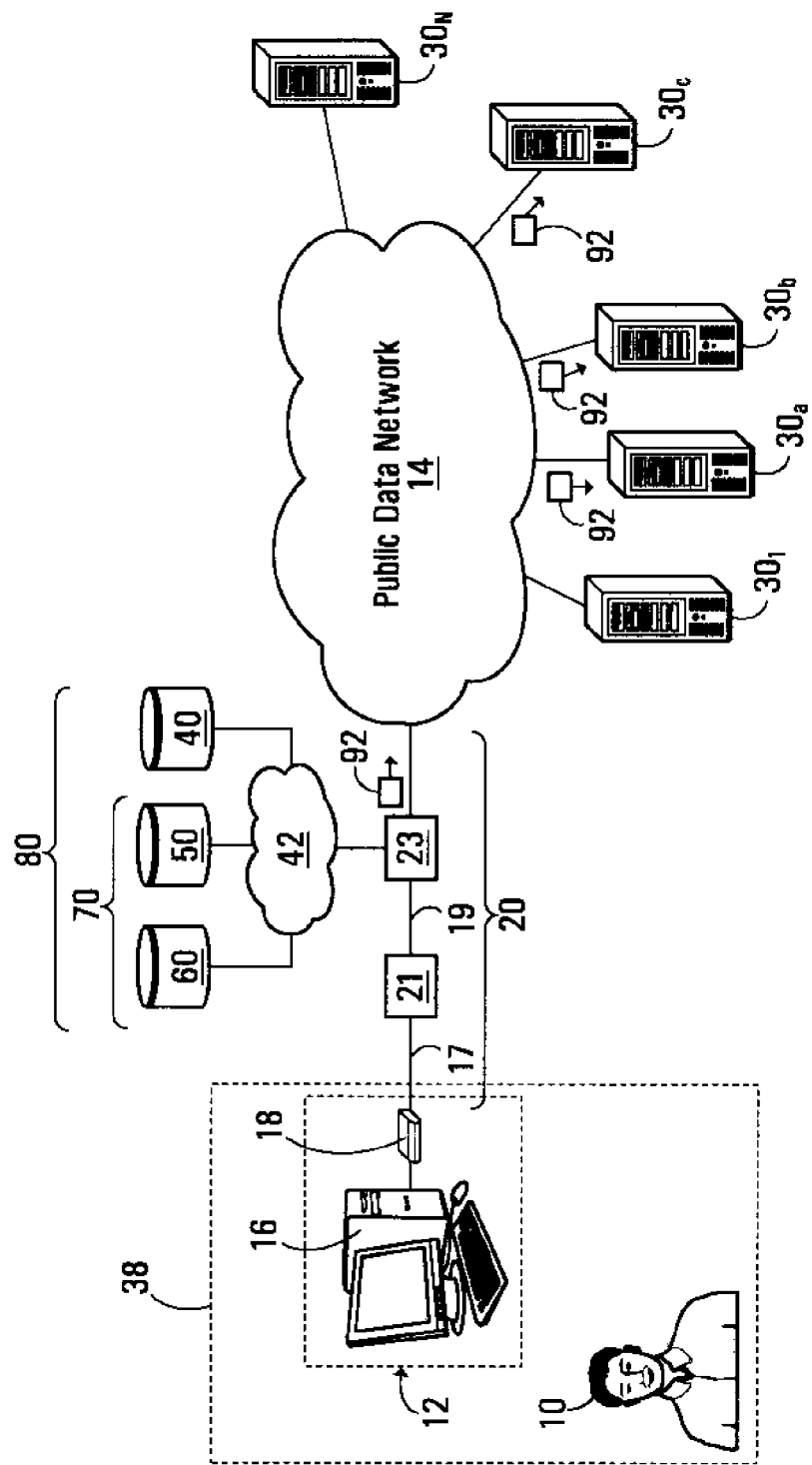
FIG. 6 shows a flow of messages illustrative of a scenario where the user of the computing device is online, and where the service provider determines that an online transaction is susceptible of taking place and consequently broadcasts a voucher to multiple network sites.

In an alternative embodiment of the present invention, now described with reference to FIG. 6, consider the example scenario where user 10 has not yet begun interacting with any merchant website, but has merely employed computing device 16 to gain access to the public data network 14 from service point 38 associated with customer "Bob Smith". In the manner described previously, access server 23 provides computing device 16 with a particular logical identifier (say, "9.10.11.12"). Therefore, although access server 23 can consult database 40 to determine that "Bob Smith" is online, access server 23 does not necessarily have a reason to suspect that an online transaction will be requested by a device using logical identifier "9.10.11.12". Nevertheless, access server 23 may consult database 50 to determine whether "Bob Smith" is a premium customer and, if so, access server 23 may consult database 60 to determine the identity of one of more whitelisted network sites. Alternatively, access server 23 may consult database 70 to determine the identity of one or more whitelisted network sites for customer "Bob Smith". Let the whitelisted network sites be those implemented by servers 30a, 30b and 30c ($1 \leq a$, b, $c \leq N$). Following this, access server 23 broadcasts a voucher 92 to servers 30a, 30b and 30c.

The voucher 92 broadcast to servers 30a, 30b and 30c may be in the form of an electronic message comprising logical identifier "9.10.11.12". Again, in accordance with two non-limiting possibilities, the voucher 92 can be encrypted if it is to be sent over an untrusted channel (such as the public data network 14) or it can be sent over a secure channel separate from the public data network. The voucher 92 may be encoded in a format that alerts each of servers 30a, 30b and 30c as to its significance, namely that the service provider has agreed to act as the payer for an eventual online transaction requested by a device that uses logical identifier "9.10.11.12" (which, in this case, is computing device 16). Of course, the voucher 92 broadcast to servers 30a, 30b, 30c may comprise additional information that can be obtained from database 50, such as a pecuniary and/or temporal restriction associated with the eventual online transaction. The voucher 92 sent to servers 30a, 30b and 30c may further contain information regarding the service provider responsible for managing the entity from which the voucher 92 is being sent. Such information may be provided in a message header, for example. It should be appreciated that for security purposes, the voucher 92 may also specify a time-out period after which the information contained therein is no longer valid.

Upon receipt from access server 23 of the voucher 92 indicative of the service provider having agreed to act as the payer for an online transaction that is susceptible of being requested by a device using logical identifier "9.10.11.12", each of servers 30a, 30b and 30c functions in a way that will now be described. Generally speaking, each of servers 30a, 30b and 30c creates a record for logical identifier "9.10.11.12", and stores therein information regarding the service provider responsible for managing the service provider entity that sent the voucher 92, which information may be contained in a message header of the voucher 92. It should be appreciated that a validation stage may take place to ensure that the service provider information being received in connection with the voucher 92 concurs with the identity of a service provider with which the merchant website implemented by the server in question (namely, one of servers 30a, 30b or 30c) has established a trust relationship. If the voucher 92 also specifies a pecuniary and/or temporal restriction, or a time-out period, such information is also stored in the record for the particular logical identifier. Similar records can be created for other logical identifiers used by devices involved in potential transactions with the merchant website implemented by server in question. The records may be kept in a memory of the server in question.

Consider now the scenario where user 10 interacts with the merchant website implemented by server 30a using computing device 16 in order to select one or more products and/or services for purchase. This may involve user 10 using an online shopping cart implemented by server 30a. It is assumed for the purposes of the present example that interaction with the merchant website carries on until it reaches the "check-out" phase. This is a phase where user 10 indicates that he/she desires to purchase the selected product(s) and/or service(s), for instance, by selecting a "check-out" option on the merchant website implemented by server 30n. This constitutes a request for an online transaction by the computing device 16. The remainder of this example scenario is identical to that given above.

Figure 7:
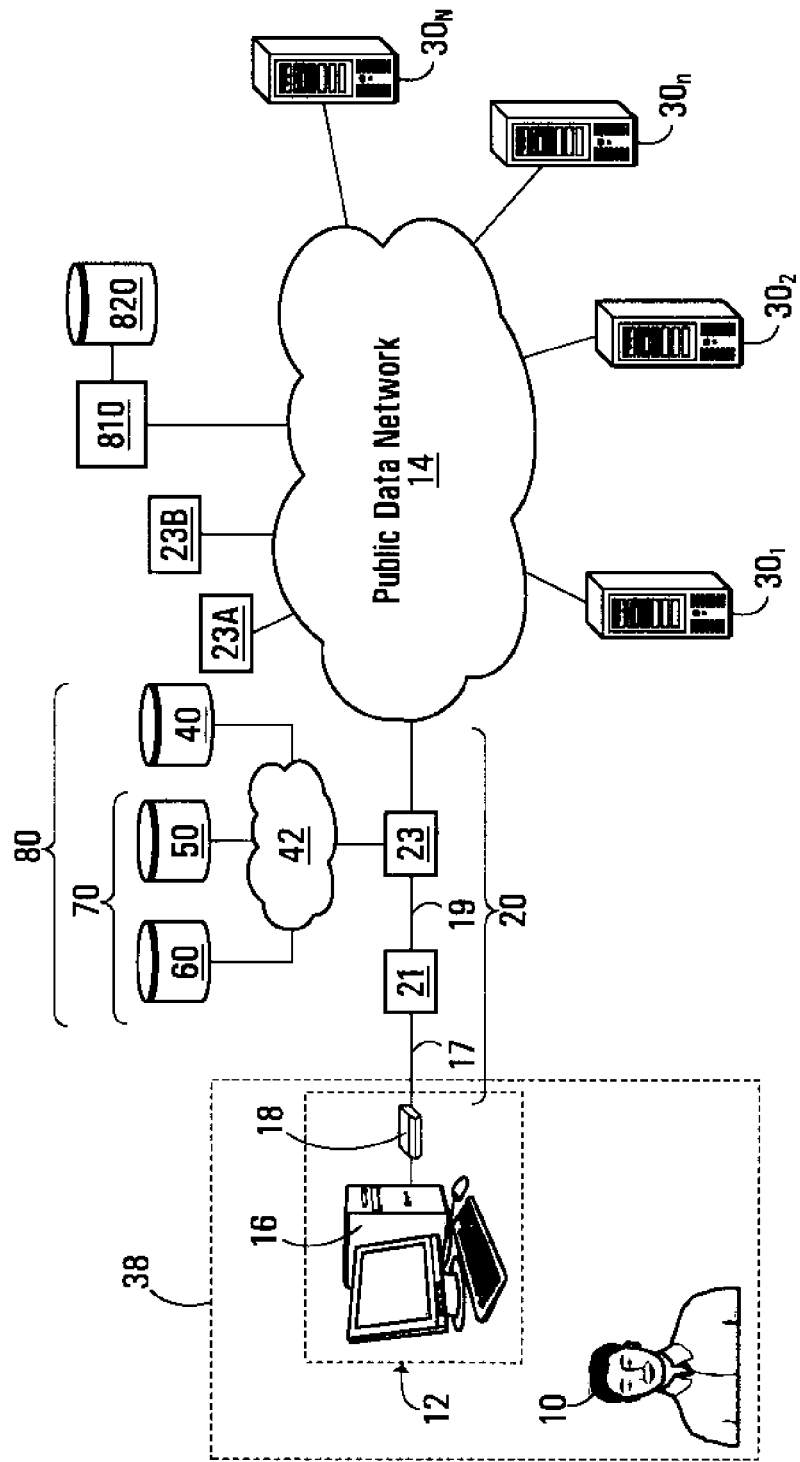
FIG. 7 shows an architecture similar to that of FIG. 1, but where there are multiple service providers and where there is provided a clearinghouse entity.

In the above examples, databases 40, 50, 60 and 70 were assumed to be directly accessible to access server 23. However, where a merchant can be contacted by multiple service providers, a clearinghouse model can be employed. Specifically, some of the information contained in the databases 40, 50, 60, 70 may be stored by a third party, hereinafter referred to as a "clearinghouse", which is trusted by multiple service providers and multiple merchants whose websites may be contacted over the public data network 14. To this end, reference is made to FIG. 7, which is based on the architecture in FIG. 1, but where multiple access servers 23A, 23B are associated with respective service providers. Also, FIG. 7 illustrates a clearinghouse server 810 having access to a database 820, which associates logical identifiers to service provider payers. That is to say, the database 820 can be queried based on a particular logical identifier to output the identity of a service provider that has agreed to act as the payer for online transactions requested by a device that uses the particular logical identifier.

The database 820 can be populated in a variety of ways. For example, each service provider (e.g., via the respective access server 23, 23A, 23B) can periodically send messages to the clearinghouse server 810 to instruct the latter to add to the database 820 certain logical identifiers for which it agrees to act as the payer. It is envisaged that the logical identifiers being added to the database 820 will be those associated with premium customers as far as the particular service provider in question provider is concerned. Other messages sent by the service provider (e.g., via the respective access server 23, 23A, 23B) may be to instruct the clearinghouse server 810 to remove certain logical identifiers from the database 820, which can occur when the associated customers change status and are no longer considered premium customers by the service provider in question. Also, when a given computing device goes offline (i.e., is no longer connected to the public data network 14), its associated logical identifier can be removed from the database 820 (and, for example, placed back into the pool of IP addresses) in order to prevent security breaches and also to prevent the mis-association of logical identifiers to customers in an environment where logical identifiers are assigned in a dynamic fashion. The information in the database 820 can thus be kept up to date by the various service providers.

It should be appreciated that the database 820 may also include, for each logical identifier associated with a service provider payer, information related to certain restrictions, such as a pecuniary restriction, applicable to transactions requested by devices that use the logical identifier in question. An example of a pecuniary restriction is a maximum dollar amount of an online transaction for which the service provider will agree to act as the payer. Still other information may be included such as temporal restriction (e.g., times of the day or days of the week during which the service provider will agree to act as the payer for an online transaction requested by the particular premium customer), and so on. It is also envisaged that in some embodiments, service providers may send, along with logical identifiers, the identities of the associated customers, to be stored in the database 820, whereas in other embodiments, anonymity may be preserved.

Figure 8:
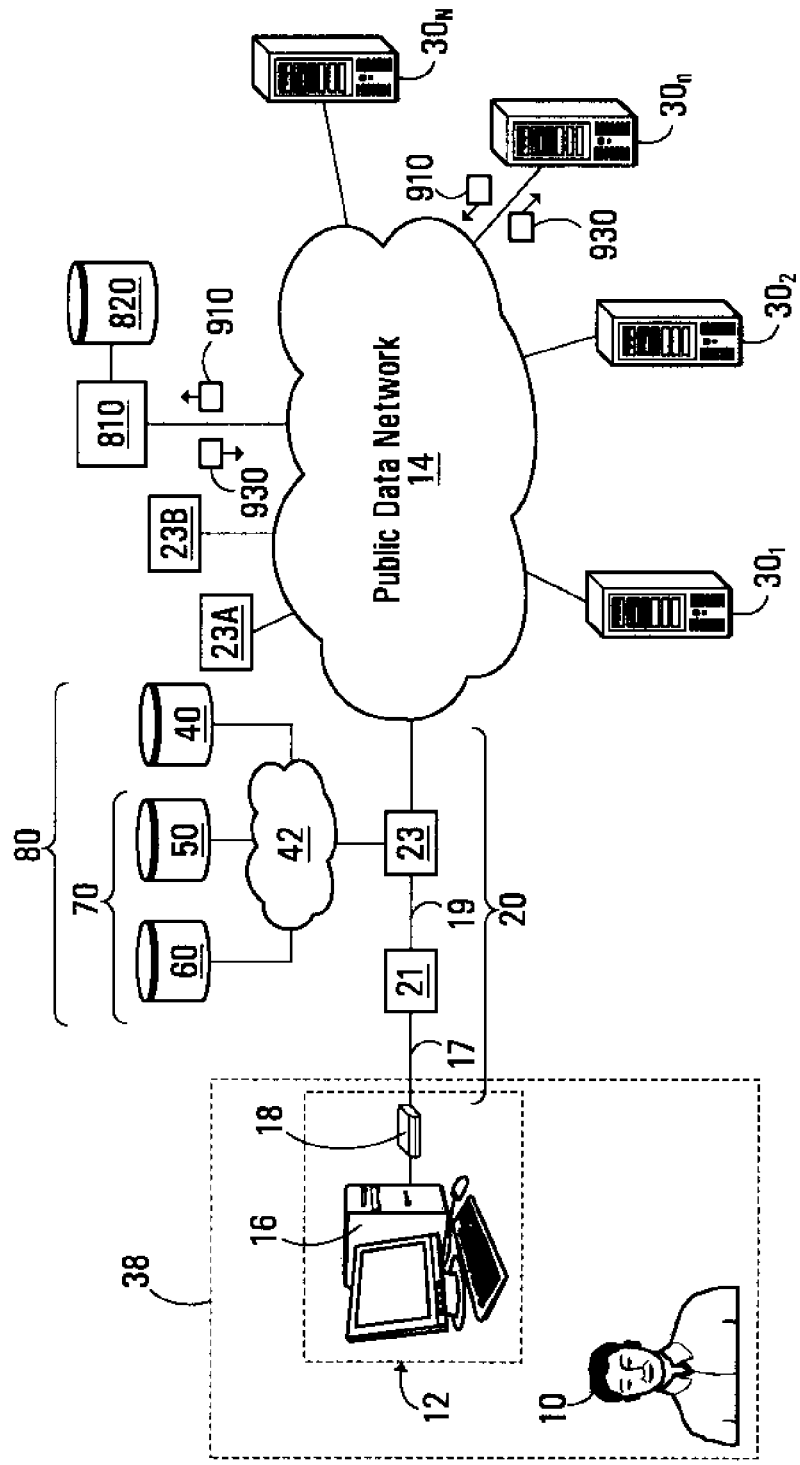
FIG. 8 shows a flow of messages illustrative of a scenario where the user of the computing device interacts with a network site in order to request an online transaction, and where the network site consults with the clearinghouse entity in FIG. 7 to identify a service provider having agreed to act as a payer for the online transaction.

In operation, and with reference to FIG. 8, consider the example scenario where user 10 interacts with the merchant website implemented by server 30n using computing device 16 in order to select one or more products and/or services for purchase. This may involve user 10 using an online shopping cart implemented by server 30n. In this non-limiting example, computing device 16 employs logical identifier "13.14.15.16". In this embodiment, server 30n makes a determination that an online transaction is susceptible of being requested by a device that is using logical identifier "13.14.15.16" (which, in this case, is computing device 16).

Server 30n then sends a request message 910 to the clearinghouse server 810 which is reachable at a known location over the public data network 14. The request message 910 includes logical identifier "13.14.15.16". Meanwhile, server 30n creates a record for logical identifier "13.14.15.16", where information responsive to the request message 910 will be stored when it is received from the clearinghouse server 810.

The clearinghouse server 810 receives the request message 910 and consults database 820 to identify the service provider payer, if any, associated with logical identifier "13.14.15.16". If database 820 contains no indication of a service provider payer in association with logical identifier "13.14.15.16", then the clearinghouse server 810 may send a deny message (not shown) to server 30n indicating this fact. However, if database 820 does contain an indication of a service provider payer in association with logical identifier "13.14.15.16", which is assumed to be the case here, then the clearinghouse server 810 returns an accept message 930 to server 30n.

Under a first non-limiting possibility, the accept message 930 is similar to the previously described accept message 530, except that it specifies the identity of the service provider payer that has been successfully identified in association with logical identifier "13.14.15.16", namely the identity of the service provider that has agreed to act as the payer for an eventual online transaction requested by a device that uses logical identifier "13.14.15.16".

Under a second non-limiting possibility, the accept message 930 specifies an account number for the service provider payer. Specifically, the service provider may have different accounts created with different merchant websites, and this information may be stored in database 820 or in a separate database. In order to obtain the account number for the service provider payer with the merchant website implemented by server 30n, the clearinghouse server 810 determines that the request message 910 was received from server 30n and then consults the appropriate database (either 820 or a separate database) on the basis of this information to obtain the account number for the service provider payer as would be understood by the merchant website implemented by server 30n.

Under a third non-limiting possibility, the accept message 930 specifies an alternate source of funds (such as a credit card number or a billing address for invoicing) instead of or in addition to the identity of the service provider payer.

Under any of the above non-limiting possibilities, the accept message 930 sent to server 30n may comprise additional information that can be obtained from database 820, such as a pecuniary and/or temporal restriction associated with the eventual online transaction.

Upon receipt from the clearinghouse server 810 of the accept message 930, server 30n stores in the aforesaid record for logical identifier "13.14.15.16" the identity of the service provider payer and/or the account number for the service provider payer and/or credit card information for the service provider payer, depending on the format and contents of the accept message 930. If the response message 930 also specifies a pecuniary and/or temporal restriction, or a time-out period, such information is also stored in the record for logical identifier "13.14.15.16".

Meanwhile, interaction of computing device 16 with the merchant website carries on, as do possibly other interactions involving other devices. Although the interaction involving computing device 16 may be aborted at any time, it is assumed for the purposes of the present example that it reaches the "check-out" phase, where user 10 indicates that he/she desires to purchase the selected product(s) and/or service(s), e.g., by selecting a "check-out" option on the merchant website implemented by server 30n. This constitutes a request for an online transaction by the computing device 16. The remainder of this example scenario is identical to that given above.

Figure 9:
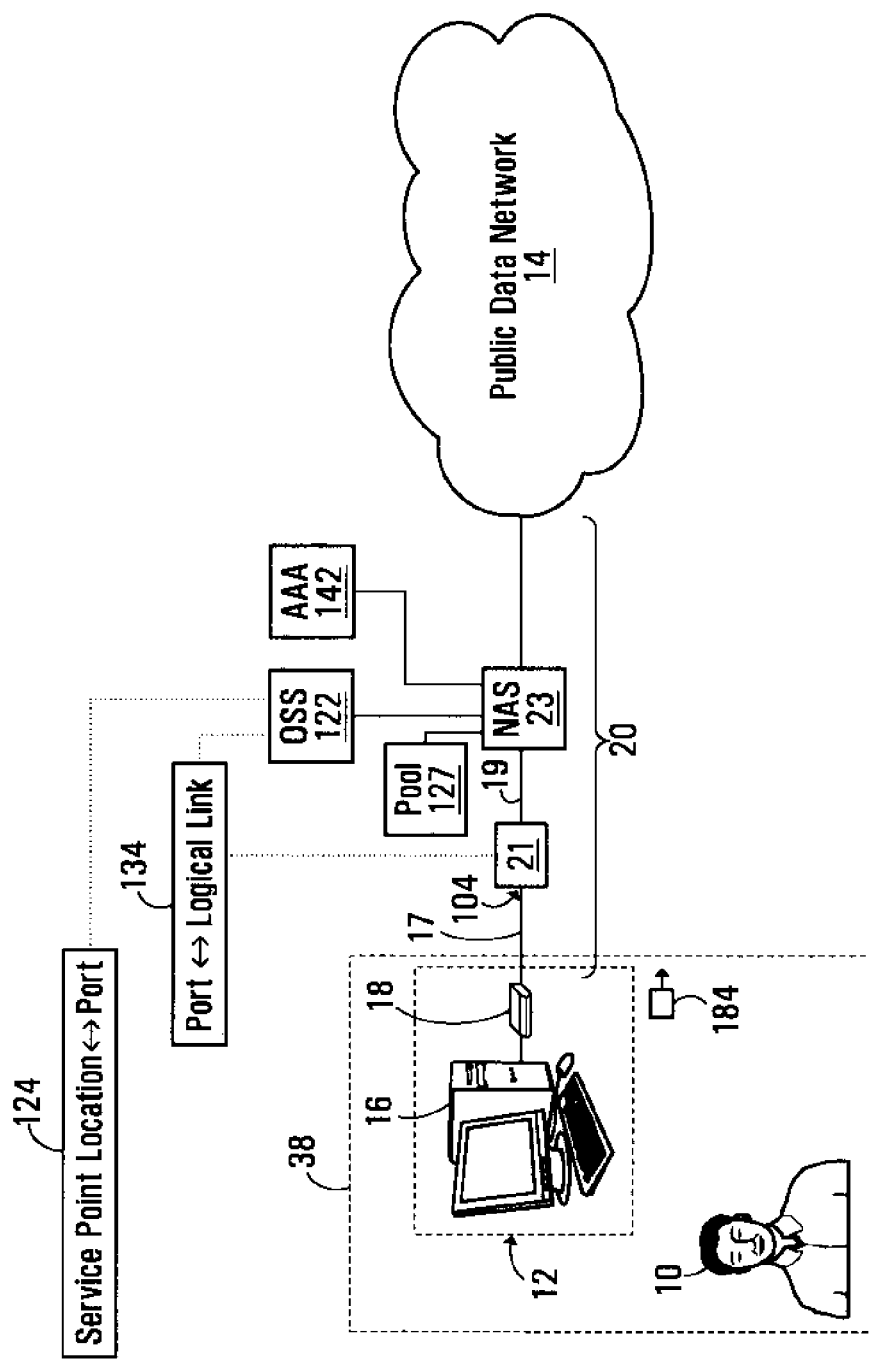
FIG. 9 shows a flow of messages illustrative of an example process by which the database of FIG. 2 may be populated.

Turning now to FIG. 9, an example process by which the database 40 may be populated will be described. In this example, the architecture of FIG. 1 is further detailed to include an operation support system (OSS) 122. The OSS 122 represents a collection of systems that perform management, inventory, engineering, planning, repair and other functions for the service provider providing network access to customer premises equipment 12 at service point 38. In this light, one of the functions of the OSS 122 may include management of network elements, assets and equipment. Thus, the OSS 122 maintains a mapping 124 between, on the one hand, ports of various access multiplexers or other network elements under control of the service provider and, on the other, service point locations of various customer premises equipment (such as customer premises equipment 12) connected to those ports. In this case, the mapping 124 maintained by the OSS 122 relates a port 104 of network element 21 to a service point location, i.e., the location of service point 38 where customer premises equipment 12 is located. This service point location may be expressed as a civic address, a set of geo-coordinates, or any other information identifying where the service point 38 is located.

Also, in this example, network element 21 is an access multiplexer. In one embodiment, the access multiplexer 21 may be a DSLAM. Access multiplexer 21 is connected to access server 23. Access server 23 provides access to the public data network 14. Communication between access multiplexer 21 and access server 23 can take place over the dedicated logical link 19 between these elements. Dedicated logical link 19, which may traverse an intervening access data network (not shown), can be implemented in various ways. For example, in one embodiment, dedicated logical link 19 may be implemented as an asynchronous transfer mode (ATM) permanent virtual circuit (PVC). In another embodiment, dedicated logical link 19 may be implemented as a virtual local area network (VLAN). It will be appreciated that various other implementations of dedicated logical link 19 are possible.

Access multiplexer 21 allows data arriving from access server 23 along given ATM PVCs, VLANs or other dedicated logical links to be sent over corresponding physical links via corresponding one of its ports, and vice versa. Thus, access multiplexer 21 can be said to implement a mapping 134 between, on the one hand, dedicated logical links and, on the other, ports of access multiplexer 21. In this example, the mapping 134 implemented by access multiplexer 21 relates dedicated logical link 19 to port 104 of the access multiplexer 21. In two example embodiments, the mapping 134 can be maintained by either access multiplexer 21 or the OSS 122.

The architecture shown in FIG. 9 further comprises an authorization element 142 connected to access server 23. The nature of the connection between access server 23 and the authorization element 142 is immaterial and can take on many forms. For example, in one embodiment, the authorization element 142 may be a server (e.g., an Authentication, Authorization, and Accounting (AAA) server) responsive to queries from access server 23. In such an embodiment, the authorization element 142 and access server 23 may communicate using the Remote Authentication Dial In User Service (RADIUS) protocol, a description of which is available at www.ietf.org/rfc/rfc2865.txt. In another embodiment, the authorization element 142 may be a functional element integrated with access server 23.

In this example, access server 23 is operative to maintain a pool 127 of pre-allocated logical identifiers that can be used by various customer premises equipment, including customer premises equipment 12. In some embodiments, the pool 127 of logical identifiers may be built up as a cooperative effort between access server 23 and the OSS 122, while in other embodiments, it may not be necessary for the OSS 122 to be involved in creating the pool 127 of logical identifiers. In still other embodiments, the pool 127 of logical identifiers may be maintained by the authorization element 142, and may be made accessible to the authorization element 142 without needing to pass through access server 23.

It will be appreciated that numerous modifications and variations of the architecture of FIG. 9 are possible. For example, in some embodiments, access multiplexer 21 can be omitted. This may be true in embodiments where the customer premises equipment 12 implements a wireless access point. For instance, in such embodiments, the connection between the wireless access point and access server 23 may be provided by a dedicated point-to-point link. As another example, in some embodiments, instead of dedicated logical link 19, there may be a shared link leading to the customer premises equipment 12.

Figure 10:
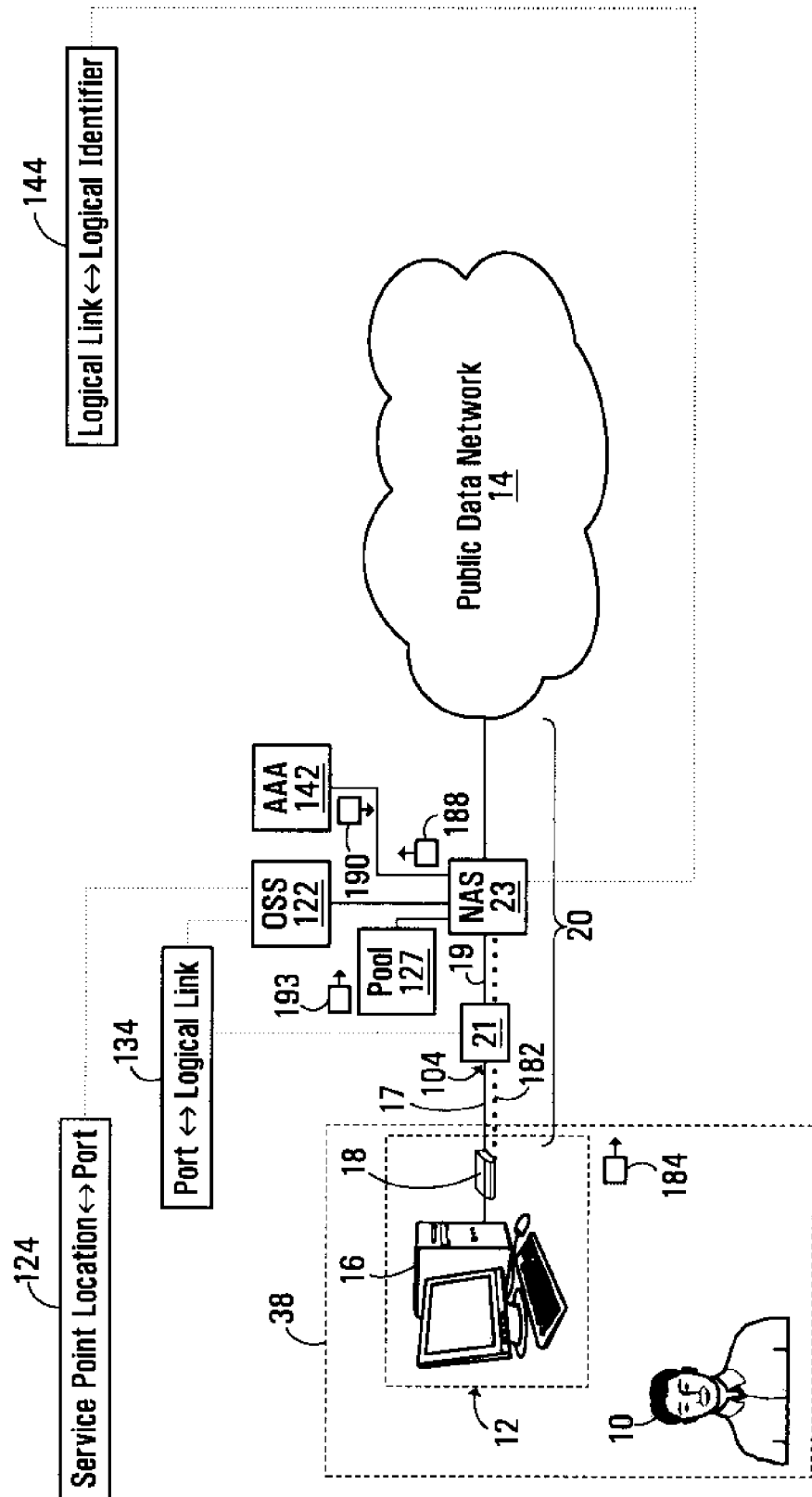
FIG. 10 shows a flow of messages that may be exchanged when the user's computing device is powered up.

Reference is now made to FIG. 10, which illustrates an example of a possible event flow upon activation of the customer premises equipment 12, which may occur, for instance, as network interface unit 18 and/or computing device 16 of customer premises equipment 12 is/are powered up. Thereafter:

Customer premises equipment 12 establishes physical layer connectivity with access multiplexer 21 over physical link 17.

This is followed by establishment of Ethernet connectivity between customer premises equipment 12 and access multiplexer 21.

Customer premises equipment 12 verifies its ability to communicate using Point-to-Point Protocol over Ethernet (PPPoE). For a more detailed explanation of PPPoE, one may refer to Internet Request For Comments (RFC) 2516, available from the Internet Engineering Task Force (http://www.ietf.org), hereby incorporated by reference herein.

Next, assuming that customer premises equipment 12 has the ability to communicate using PPPoE, it verifies whether it should make a so-called "access request" automatically or in response to user input (which can be obtained via a software application). For purposes of this example, let it be assumed that conditions have been met such that customer premises equipment 12 should make an access request.

Customer premises equipment 12 begins entry into PPPoE communication by broadcasting an "initiation" packet over dedicated logical link 19.

Access server 23 responds to receipt of the initiation packet by sending an "offer" packet to customer premises equipment 12. Thus, at this stage, it can be said that a logical connection 182 has been defined between a first endpoint (i.e., customer premises equipment 12) and a second endpoint (i.e., access server 23).

Following receipt of the offer packet, customer premises equipment 12 sends an access request 184 to access server 23 with the ultimate goal of accessing the public data network 14. The access request 184 may comprise credentials that can be hard coded or programmably installed on customer premises equipment 12. Alternatively, the credentials may be entered by user 10 via computing device 16.

Upon receipt of the access request 184 containing the credentials along dedicated logical link 19, access server 23 executes an authorization procedure as follows. Access server 23 communicates the credentials to the authorization element 142, e.g., via a RADIUS Access-Request message 188. In response to receipt of the credentials from access server 23, the authorization element 142 determines whether the credentials allow access to the public data network 14. For example, this can be determined by consulting a database (not shown). If the credentials allow access to the public data network 14, the authorization element 142 returns an acceptance message (e.g., a RADIUS Access-Accept message). On the other hand, if the credentials do not allow access to the public data network 14, the authorization element 142 returns a refusal message (e.g., a RADIUS Access-Reject message). For purposes of this example, assume that the credentials allow access to the public data network 14, resulting in issuance of an acceptance message 190. In this example, two alternatives are possible:

Alternative 1 (where the pool 127 of logical identifiers is maintained by the authorization element 142): the authorization element 142 obtains a logical identifier 193 from the pool 127 of logical identifiers that is maintained by the authorization element 142. The logical identifier 193 is sent to access server 23, which then considers the logical identifier 193 as being reserved for use by devices that will communicate over dedicated logical link 19.

Alternative 2 (where the pool 127 of logical identifiers is maintained by access server 23): responsive to receipt of the acceptance message 190 from the authorization element 142, access server 23 obtains a logical identifier 193 from the pool 127 of logical identifiers that is maintained by access server 23. The logical identifier 193 so obtained is considered by access server 23 as being reserved for use by devices that will communicate over dedicated logical link 19.

Access server 23 sends a "confirmation" packet back to the customer premises equipment 12, thus completing establishment of a PPPoE session between the endpoints of the logical connection 182.

Additional handshaking may be performed between customer premises equipment 12 and access server 23 in order to establish a Point-to-Point Protocol (PPP) session between the endpoints of the logical connection 182.

Following this, further handshaking may be undertaken between customer premises equipment 12 and access server 23 in order to establish an Internet Protocol Control Protocol (IPCP) session between the endpoints of the logical connection 182.

During the IPCP session, access server 23 releases the logical identifier 193 towards customer premises equipment 12, in order to allow the latter to identify itself using the logical identifier 193 in future communications over dedicated logical link 19.

The fact that access server 23 knows that devices communicating over dedicated logical link 19 will use a specific logical identifier 193 allows access server 23 to construct and maintain a mapping 144 between, on the one hand, various dedicated logical links (such as dedicated logical link 19 and others) and, on the other hand, logical identifiers corresponding to those dedicated logical links.

Figure 11:
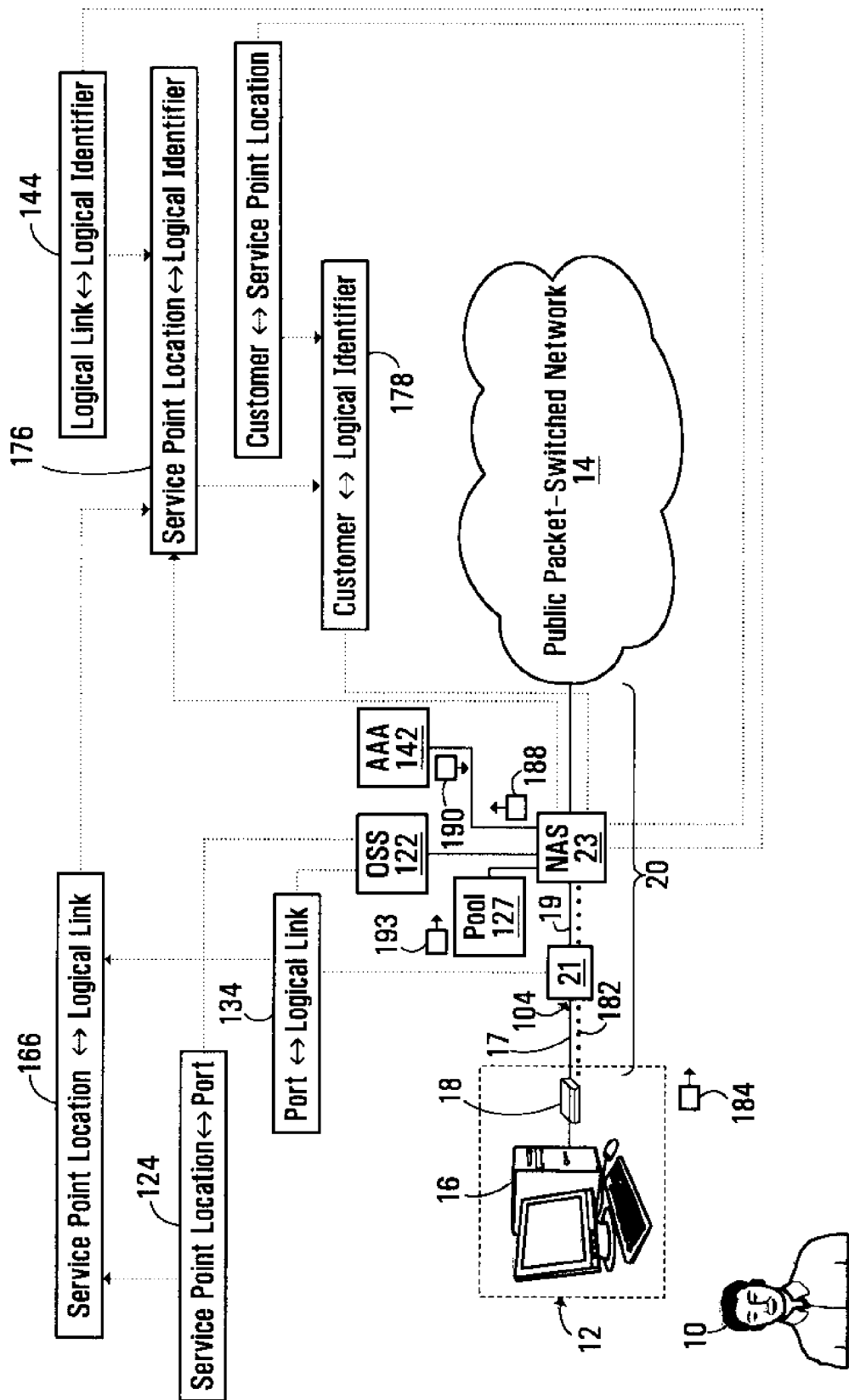
FIG. 11 conceptually illustrates creation of a mapping between logical identifiers and customers.

Furthermore, with reference to FIG. 11, by combining the mapping 124 with the mapping 134, the OSS 122 can create an intermediate mapping 166 between, on the one hand, dedicated logical links and, on the other hand, service point locations of customer premises equipment having logical connections with access server 23 which traverse those dedicated logical links. In this example, the intermediate mapping 166 would associate the dedicated logical link 19 to the service point location of customer premises equipment 12. In one embodiment, the OSS 122 transmits the intermediate mapping 166 to access server 23.

Next, access server 23 combines the intermediate mapping 166 (received from the OSS 122) with the aforementioned mapping 144, thus creating a further intermediate mapping 176 between, on the one hand, logical identifiers (such as IP addresses) and, on the other, service point locations whose logical connections with access server 23 traverse respective dedicated logical links over which devices are expected to communicate using those logical identifiers. In this example, the further intermediate mapping 176 would specify that the logical identifier 193 corresponds to the service point location of customer premises equipment 12, i.e., the location of the service point 38 where customer premises equipment 12 is located.

Finally, access server 23 combines the further intermediate mapping 176 with information maintained in the aforementioned customer service database, which stores an association between customers and service point locations. The outcome is a final mapping 178 between, on the one hand, logical identifiers (such as IP addresses) and, on the other, customers. The final mapping 178 is stored in database 40, where logical identifiers are unequivocally associated with individual customers.

Of course, those skilled in the art will be able to contemplate other ways of causing customer premises equipment 12 to send the access request 184 over the logical connection 182 between customer premises equipment 12 and access server 23, as well as other ways of selecting a logical identifier for use by devices communicating over dedicated logical link 19. It should further be mentioned that, in some cases, the establishment of the aforementioned PPPoE, PPP and/or IPCP sessions may not be required. This is particularly the case where dedicated logical link 19 would be a VLAN.

It should also be appreciated that the access servers 23, 23A, 23B and the network servers 30$_1$ . . . 30$_N$ can be caused to carry out one or more of the methods described herein by executing computer-readable program code stored by one or more memories. Of course, the methods described herein may also be carried out using hardware devices having circuits for performing one or more of the functions described herein.

It should further be appreciated that although the above references to online transactions have involved a computing device requesting an online transaction with a merchant website over the public data network 14, it is also within the scope of the invention for the computing device to be implemented as a communication device and to request an online transaction with a called party reachable over the public data network 14. Specifically, the communication device could be embodied as a VoIP phone, a Plain Old Telephone Service (POTS) phone equipped with an analog terminal adapter (ATA), or a soft phone (i.e., a computer equipped with telephony software). For its part, the called party can be a purveyor of goods or services. In this scenario, an access server (or a group of entities associated therewith) at the service provider (which is the entity that provides communication services to the communication device) operates in the above described manner to (i) determine the logical identifier used by the communication device to communicate over a network portion managed by the service provider and (ii) transmit to the called party an indication that the service provider agrees to act as the payer for at least one online transaction requested by a device (such as communication device) that uses that logical identifier.

While specific embodiments of the present invention have been described and illustrated, it will be apparent to those skilled in the art that numerous modifications and variations can be made without departing from the scope of the invention as defined in the appended claims.

What is claimed is:

1. A method, comprising:
   receiving an encrypted voucher comprising third party information providing an indication that a third party has agreed to act as a payer for at least one future online transaction requested by a requesting device that uses a particular logical identifier, the voucher specifying the particular logical identifier;
   validating the third party information of the voucher against previously established trusted third party information, the trusted third party information including payment information for the trusted third party;
   storing the particular logical identifier received in the voucher in association with an indication of the third party that has agreed to act as a payer;
   when a specific future online transaction is requested by a requesting device that uses the particular logical identifier:
      using the particular logical identifier to retrieve the indication of the third party that has agreed to act as a payer stored in association with the particular logical identifier; and
      completing said transaction using the payment information for the third party.

2. The method defined in claim 1, wherein said obtaining occurs before the requesting device requests the specific future online transaction.

3. The method defined in claim 1, further comprising determining the particular logical identifier.

4. The method defined in claim 1, further comprising providing a user of the requesting device with an opportunity to confirm the third party as the payer for said specific future online transaction.

5. The method defined in claim 4, wherein requesting payment from the third party as the payer for said transaction is carried out only if the user confirms the third party as the payer for said transaction.

6. The method of claim 1, further comprising:
receiving from a party a message conveying the particular logical identifier used by the particular device in requesting the online transaction;
consulting a data structure based on the particular logical identifier to obtain information regarding a service provider having agreed to act as a payer for an online transaction requested by a device that uses the particular logical identifier;
providing to the party the indication that the third party has agreed to act as the payer, wherein the third party is the service provider.

7. The method defined in claim 6, wherein the information regarding the service provider comprises an identity of the service provider.

8. The method defined in claim 7, wherein the message further comprises a restriction associated with the online transaction.

9. The method defined in claim 8, wherein the restriction is at least one of a pecuniary and a temporal restriction associated with the online transaction.

10. The method defined in claim 6, wherein the party is an online merchant.

11. The method defined in claim 10, wherein the information regarding the service provider comprises account information created by the online merchant for the service provider.

12. The method defined in claim 11, wherein the message further comprises a restriction associated with the online transaction.

13. The method defined in claim 12, wherein the restriction is at least one of a pecuniary and a temporal restriction associated with the online transaction.

14. The method defined in claim 6, wherein the information regarding the service provider comprises identification of a payment instrument.

15. The method defined in claim 14, wherein the payment instrument is a credit card account or debit card account.

16. The method defined in claim 7, wherein the information regarding the service provider comprises a billing address for invoicing.

17. The method defined in claim 16, wherein the message further comprises a restriction associated with the online transaction.

18. The method defined in claim 17, wherein the restriction is at least one of a pecuniary and a temporal restriction associated with the online transaction.

19. The method defined in claim 1, wherein the requesting device is identified by a logical identifier.

20. The method defined in claim 19, further comprising determining the logical identifier from said data.

21. The method defined in claim 1, wherein said monitoring comprises determining from said data that a specific online transaction is susceptible of being requested by the requesting device.

22. The method defined in claim 21, wherein said data is exchanged during a precursor phase to said specific online transaction.

23. The method defined in claim 21, wherein said data includes an indication that the specific online transaction has been requested.

24. The method defined in claim 21, wherein said determining comprises determining that the requesting device has gained access to a data network to which access is controlled by the service provider.

25. The method defined in claim 1, further comprising transmitting to the computing apparatus an indication of validity of a time period during which said service provider has agreed to act as the payer for at least one online transaction requested by the requesting device.

26. The method defined in claim 19, further comprising:
identifying a customer associated with said logical identifier; and
determining at least one restriction associated with transactions involving said customer.

27. The method defined in claim 26, further comprising transmitting to said computing apparatus an indication of said at least one restriction.

28. The method defined in claim 27, wherein said at least one restriction indicates a maximum dollar amount per transaction.

29. The method defined in claim 27, wherein said at least one restriction further comprises a temporal restriction.

30. A network entity, comprising:
an interface configured to communicate over a network portion managed by a service provider; and
a processing unit configured to:
receive an encrypted voucher comprising third party information providing an indication that a third party has agreed to act as a payer for at least one future online transaction requested by a requesting device that uses a particular logical identifier, the voucher specifying the particular logical identifier;
validate the third party information of the voucher against previously established trusted third party information, the trusted third party information including payment information for the trusted third party;
store the particular logical identifier received in the voucher in association with an indication of the third party that has agreed to act as a payer;
when a specific future online transaction is requested by a requesting device that uses the particular logical identifier:
use the particular logical identifier to retrieve the indication of the third party that has agreed to act as a payer stored in association with the particular logical identifier; and
complete said transaction using the payment information for the third party.

31. A computer-readable medium comprising computer-readable program code which, when interpreted by a network entity, causes the network entity to execute a method, the computer-readable program code comprising:
first computer-readable program code for causing the network entity to receive an encrypted voucher comprising third party information providing an indication that a third party has agreed to act as a payer for at least one future online transaction requested by a requesting device that uses a particular logical identifier, the voucher specifying the particular logical identifier;
second computer-readable program code for causing the network entity to validate the third party information of the voucher against previously established trusted third party information, the trusted third party information including payment information for the trusted third party;
third computer-readable program code for causing the network entity to fourth computer-readable program code for causing the network entity to, when a specific future online transaction is requested by a requesting device that uses the particular logical identifier:
use the particular logical identifier to retrieve the indication of the third party that has agreed to act as a payer stored in association with the particular logical identifier; and
complete said transaction using the payment information for the third party.

\* \* \* \* \*